(12) United States Patent
Muchow

(10) Patent No.: US 7,421,478 B1
(45) Date of Patent: Sep. 2, 2008

(54) METHOD AND APPARATUS FOR EXCHANGING HEARTBEAT MESSAGES AND CONFIGURATION INFORMATION BETWEEN NODES OPERATING IN A MASTER-SLAVE CONFIGURATION

(75) Inventor: James D. Muchow, Zimmerman, MN (US)

(73) Assignee: Cisco Technology, Inc., San Jose, CA (US)

( * ) Notice: Subject to any disclaimer, the term of this patent is extended or adjusted under 35 U.S.C. 154(b) by 577 days.

(21) Appl. No.: 10/094,552

(22) Filed: Mar. 7, 2002

(51) Int. Cl.
*G06F 15/16* (2006.01)
*G06F 11/00* (2006.01)

(52) U.S. Cl. .............. 709/209; 714/2; 714/11; 714/44; 714/55

(58) Field of Classification Search ......... 709/201–250; 714/1–57; 719/313–318, 311
See application file for complete search history.

(56) References Cited

U.S. PATENT DOCUMENTS

| | | | |
|---|---|---|---|
| 4,495,617 A | 1/1985 | Ampulski et al. | |
| 5,390,326 A | * 2/1995 | Shah | ................ 370/222 |
| 5,461,608 A | 10/1995 | Yoshiyama | |
| 5,473,599 A | 12/1995 | Li et al. | |
| 5,491,812 A | 2/1996 | Pisello et al. | |
| 5,535,395 A | 7/1996 | Tipley et al. | |
| 5,544,077 A | 8/1996 | Hershey | |
| 5,579,491 A | 11/1996 | Jeffries et al. | |
| 5,600,828 A | 2/1997 | Johnson et al. | |
| 5,642,337 A | 6/1997 | Oskay et al. | |
| 5,666,486 A | 9/1997 | Alfieri et al. | |
| 5,732,206 A | 3/1998 | Mendel | |
| 5,812,821 A | 9/1998 | Sugi et al. | |
| 5,832,299 A | 11/1998 | Wooten | |
| 5,850,573 A | 12/1998 | Wada | |
| 5,870,571 A | 2/1999 | Duburcq et al. | |
| 5,909,544 A | 6/1999 | Anderson et al. | |
| 5,935,215 A | 8/1999 | Bell et al. | |
| 5,951,683 A | 9/1999 | Yuuki et al. | |
| 5,991,813 A | 11/1999 | Zarrow | |
| 5,996,024 A | 11/1999 | Blumenau | |

(Continued)

OTHER PUBLICATIONS

Gusella, R et al. "An Election Algorithm for a Distributed Clock Synchronization Program", CS technical Report #275, University of California Berkeley, Dec. 1985, pp. 1-14.*

(Continued)

*Primary Examiner*—William Thomson
*Assistant Examiner*—Charles Anya
(74) *Attorney, Agent, or Firm*—Schwegman, Lundberg & Woessner, P.A.

(57) ABSTRACT

A node (101, FIG. 1), within a networked computer system (100), is capable of supporting communications with other nodes relating to operating multiple application instances in a master-slave configuration. Each node periodically generates and sends (520, 526, FIG. 5) a Heartbeat message (FIG. 8) that indicates the operational status for one or more application instances being managed by the node. When a node receives a Heartbeat message from a remote node, it evaluates (FIG. 10) the Heartbeat information for each application instance reported in the message, and takes any appropriate actions. The node also determines (1206, FIG. 12) whether new configuration information should be obtained for each of the application instances the node is managing, and requests (1210, FIG. 12) that new configuration information, when necessary.

34 Claims, 13 Drawing Sheets

U.S. PATENT DOCUMENTS

| | | |
|---|---|---|
| 5,996,027 A | 11/1999 | Volk et al. |
| 6,006,259 A | 12/1999 | Adelman et al. |
| 6,009,476 A | 12/1999 | Flory et al. |
| 6,009,480 A | 12/1999 | Pleso |
| 6,018,765 A | 1/2000 | Durana et al. |
| 6,041,381 A | 3/2000 | Hoese |
| 6,078,957 A | 6/2000 | Adelman et al. |
| 6,108,300 A | 8/2000 | Coile et al. |
| 6,108,699 A | 8/2000 | Moiin |
| 6,131,119 A | 10/2000 | Fukui |
| 6,134,673 A | 10/2000 | Chrabaszcz |
| 6,145,019 A | 11/2000 | Firooz et al. |
| 6,151,297 A | 11/2000 | Congdon et al. |
| 6,163,855 A | 12/2000 | Shrivastava et al. |
| 6,178,445 B1 | 1/2001 | Dawkins et al. |
| 6,185,620 B1 | 2/2001 | Weber et al. |
| 6,195,687 B1 | 2/2001 | Greaves et al. |
| 6,195,760 B1 | 2/2001 | Chung et al. |
| 6,209,023 B1 | 3/2001 | Dimitroff et al. |
| 6,219,771 B1 | 4/2001 | Kikuchi et al. |
| 6,268,924 B1 | 7/2001 | Koppolu et al. |
| 6,269,396 B1 | 7/2001 | Shah et al. |
| 6,314,526 B1 | 11/2001 | Arendt et al. |
| 6,327,622 B1 | 12/2001 | Jindal et al. |
| 6,343,320 B1 | 1/2002 | Fairchild et al. |
| 6,353,612 B1 | 3/2002 | Zhu et al. |
| 6,363,416 B1 * | 3/2002 | Naeimi et al. ............... 709/209 |
| 6,378,025 B1 | 4/2002 | Getty |
| 6,392,990 B1 | 5/2002 | Tosey et al. |
| 6,393,583 B1 | 5/2002 | Meth et al. |
| 6,400,730 B1 | 6/2002 | Latif et al. |
| 6,449,652 B1 | 9/2002 | Blumenau et al. |
| 6,470,382 B1 | 10/2002 | Wang et al. |
| 6,470,397 B1 | 10/2002 | Shah et al. |
| 6,473,803 B1 | 10/2002 | Stern et al. |
| 6,480,901 B1 | 11/2002 | Weber et al. |
| 6,484,245 B1 | 11/2002 | Sanada et al. |
| 6,560,630 B1 | 5/2003 | Vepa et al. |
| 6,574,755 B1 | 6/2003 | Seon |
| 6,591,310 B1 | 7/2003 | Johnson |
| 6,597,956 B1 | 7/2003 | Aziz et al. |
| 6,640,278 B1 | 10/2003 | Nolan et al. |
| 6,654,830 B1 | 11/2003 | Taylor et al. |
| 6,658,459 B1 | 12/2003 | Kwan et al. |
| 6,665,702 B1 | 12/2003 | Zisapel et al. |
| 6,678,721 B1 | 1/2004 | Bell |
| 6,683,883 B1 | 1/2004 | Czeiger et al. |
| 6,691,244 B1 | 2/2004 | Kampe et al. |
| 6,697,924 B2 | 2/2004 | Swank |
| 6,701,449 B1 | 3/2004 | Davis et al. |
| 6,718,361 B1 | 4/2004 | Basani et al. |
| 6,718,383 B1 | 4/2004 | Hebert |
| 6,721,907 B2 | 4/2004 | Earl |
| 6,724,757 B1 | 4/2004 | Zadikian et al. |
| 6,728,780 B1 | 4/2004 | Hebert |
| 6,748,550 B2 * | 6/2004 | McBrearty et al. ............. 714/4 |
| 6,757,291 B1 | 6/2004 | Hu |
| 6,760,783 B1 | 7/2004 | Berry |
| 6,763,195 B1 | 7/2004 | Willebrand et al. |
| 6,763,419 B2 | 7/2004 | Hoese et al. |
| 6,766,520 B1 | 7/2004 | Rieschl et al. |
| 6,771,663 B1 | 8/2004 | Jha |
| 6,771,673 B1 | 8/2004 | Baum et al. |
| 6,799,316 B1 | 9/2004 | Aguilar et al. |
| 6,807,581 B1 | 10/2004 | Starr et al. |
| 6,823,418 B2 | 11/2004 | Langendorf et al. |
| 6,839,752 B1 | 1/2005 | Miller et al. |
| 6,845,403 B2 | 1/2005 | Chadalapaka |
| 6,856,591 B1 | 2/2005 | Ma et al. |
| 6,859,462 B1 | 2/2005 | Mahoney et al. |
| 6,874,147 B1 | 3/2005 | Diamant |
| 6,877,044 B2 | 4/2005 | Lo et al. |
| 6,885,633 B1 | 4/2005 | Mikkonen |
| 6,886,171 B2 | 4/2005 | MacLeod |
| 6,889,338 B2 | 5/2005 | Srinivasan et al. |
| 6,895,461 B1 | 5/2005 | Thompson |
| 6,920,491 B2 | 7/2005 | Kim |
| 6,922,743 B2 | 7/2005 | Mizuno |
| 6,934,799 B2 | 8/2005 | Acharya et al. |
| 6,938,092 B2 | 8/2005 | Burns |
| 6,944,785 B2 | 9/2005 | Gadir et al. |
| 6,954,436 B1 | 10/2005 | Yip et al. |
| 6,965,934 B1 | 11/2005 | Reynolds et al. |
| 7,043,727 B2 | 5/2006 | Bennett et al. |
| 7,165,258 B1 | 1/2007 | Kuik et al. |
| 7,188,194 B1 | 3/2007 | Kuik et al. |
| 7,200,610 B1 | 4/2007 | Prawdiuk et al. |
| 7,240,098 B1 | 7/2007 | Mansee |
| 7,281,062 B1 | 10/2007 | Kuik et al. |
| 2002/0010750 A1 | 1/2002 | Baretzki |
| 2002/0023150 A1 | 2/2002 | Osafune et al. |
| 2002/0042693 A1 | 4/2002 | Kample et al. |
| 2002/0049845 A1 | 4/2002 | Sreenivasan et al. |
| 2002/0055978 A1 | 5/2002 | Joon-Bo et al. |
| 2002/0059392 A1 | 5/2002 | Ellis |
| 2002/0065872 A1 | 5/2002 | Genske et al. |
| 2002/0103943 A1 | 8/2002 | Lo et al. |
| 2002/0116460 A1 | 8/2002 | Treister et al. |
| 2002/0126680 A1 | 9/2002 | Inagaki et al. |
| 2002/0156612 A1 | 10/2002 | Schulter et al. |
| 2002/0178143 A1 | 11/2002 | Fujimoto |
| 2002/0188657 A1 | 12/2002 | Traversat et al. |
| 2002/0188711 A1 | 12/2002 | Meyer et al. |
| 2002/0194428 A1 | 12/2002 | Green |
| 2003/0005068 A1 | 1/2003 | Nickel et al. |
| 2003/0014462 A1 | 1/2003 | Bennett et al. |
| 2003/0018813 A1 | 1/2003 | Antes et al. |
| 2003/0018927 A1 | 1/2003 | Gadir et al. |
| 2003/0037284 A1 | 2/2003 | Srinivasan et al. |
| 2003/0058870 A1 | 3/2003 | Mizrachi et al. |
| 2003/0084209 A1 | 5/2003 | Chadalapaka |
| 2003/0097607 A1 | 5/2003 | Bessire |
| 2003/0115447 A1 | 6/2003 | Pham et al. |
| 2003/0140193 A1 | 7/2003 | Acharya et al. |
| 2003/0145108 A1 | 7/2003 | Joseph et al. |
| 2003/0149830 A1 | 8/2003 | Torr et al. |
| 2003/0182455 A1 | 9/2003 | Hetzler et al. |
| 2003/0208579 A1 | 11/2003 | Brady et al. |
| 2003/0210686 A1 | 11/2003 | Terrell et al. |
| 2004/0024778 A1 | 2/2004 | Cheo |
| 2004/0064553 A1 * | 4/2004 | Kjellberg ................... 709/224 |
| 2004/0141468 A1 | 7/2004 | Christensen |
| 2004/0233910 A1 | 11/2004 | Chen et al. |
| 2005/0055418 A1 | 3/2005 | Blanc et al. |
| 2005/0063313 A1 | 3/2005 | Nanavati et al. |
| 2005/0268151 A1 | 12/2005 | Hunt et al. |
| 2006/0265529 A1 | 11/2006 | Kuik et al. |
| 2007/0112931 A1 | 5/2007 | Kuik et al. |

OTHER PUBLICATIONS

Gusella, R et al. "An Election Agorithm for a Distributed Clock Synchronization Program", CS technical Report #275, University of California Berkeley, Dec. 1985, pp. 1-14.*

Gusella, R., et al., "An Election Algorithm for a Distributed Clock Synchronization Program", *CS Technical Report #275*, University of California, Berkeley, (Dec. 1985), pp. 1-14.

Gusella, R., et al., "The Berkeley UNIX Time Synchronization Protocol", *UNIX Programmers Manual, 4.3 Berkeley Software Distrib.*, vol. 2C, (1986), 10 pages.

Knight, S., et al., "Virtual Router Redundancy Protocol", search.ietf. org/rfc/rfc2338.txt, VRRP, RFC 2338, (1998), pp. 1-26.

Lewis, P., "A High-Availability Cluster for Linux", 2.linuxjournal. com/lj-issues/issue64/3247.html, (Apr. 1994), 11 pages.

Li, T., et al., "Cisco Hot Standby Router Protocol (HSRP)", search.ietf.org/rfc/rfc2281.txt, Cisco HSRP, RFC 2281, (1998), pp. 1-16.

Moore, K., "On the use of HTTP as a Substrate", search.ietf.org/rfc/rfc3205.txt, HTTP Layering, RFC 3205, (2002), pp. 1-14.

Gusella, et al., "An Election Algorithm for a Distributed Clock Synchronization Program", *CS Technical Report #275*, University of California Berkeley, 14 pages, (Dec. 1985).

Gusella, R., et al., "The Berkeley UNIX Tim Synchronization Protocol", *UNIX Programmers Manual*, 4.3 Berkeley Software Distribution, vol. 2C, 10 pages, (1986).

Lewis, P., "A High-Availability Cluster for Linux", www2.linuxjournal.com.lj-issues/issue64/3247.html, 11 Pages, (Apr. 1994).

*VMware™ ESX Server: User's Manual*, Version 1.0, retrieved from the Internet: <URL: http://web.archive.org/web/20010608201203/www.vmare.com/support>, (Jun. 6, 2001), 122-124.

Advisory Action mailed Mar. 30, 2006 in U.S. Appl. No. 10/131,274, 6 pgs.

Amendment and Response mailed Aug. 29, 2005 in U.S. Appl. No. 10/122,401, 20 pgs.

Amendment and Response mailed Jan. 8, 2007 in U.S. Appl. No. 10/128,657, 14 pgs.

Amendment and Response mailed Oct. 13, 2006 in U.S. Appl. No. 10/122,401, 25 pgs.

Amendment and Response mailed Nov. 17, 2004 in U.S. Appl. No. 10/122,401, 28 pgs.

Amendment and Response mailed Mar. 6, 2006 in U.S. Appl. No. 10/122,401, 21 pgs.

Amendment and Response mailed Mar. 6, 2006 in U.S. Appl. No. 10/131,274, 12 pgs.

Amendment and Response mailed Mar. 6, 2007 in U.S. Appl. No. 10/131,274, 12 pgs.

Amendment and Response mailed May 19, 2006 in U.S. Appl. No. 10/128,657, 13 pgs.

Amendment and Response mailed Jun. 26, 2006 in U.S. Appl. No. 10/131,275, 19 pgs.

Amendment and Response mailed Jul. 6, 2006 in U.S. Appl. No. 10/131,274, 19 pgs.

Amendment and Response mailed Sep. 16, 2005 in U.S. Appl. No. 10/128,657, 15 pgs.

Amendment and Response mailed Oct. 3, 2005 in U.S. Appl. No. 10/131,274, 13 pgs.

Amendment and Response to Office Communication mailed Feb. 28, 2007 in U.S. Appl. No. 10/122,401, 15 pgs.

Final Office Action mailed Dec. 6, 2005 in U.S. Appl. No. 10/131,274, 13 pgs.

Final Office Action mailed May 18, 2007 in U.S. Appl. No. 10/131,274, 14 pgs.

Final Office Action mailed Jun. 28, 2005 in U.S. Appl. No. 10/122,401, 33 pgs.

Final Office Action mailed Aug. 8, 2006 in U.S. Appl. No. 10/128,657, 16 pgs.

Final Office Action mailed Sep. 28, 2006 in U.S. Appl. No. 10/131,274, 11 pgs.

Non-Final Office Action mailed Oct. 6, 2005 in U.S. Appl. No. 10/122,401, 34 pgs.

Non-Final Office mailed Oct. 6, 2006 in U.S. Appl. No. 10/131,274, 11 pgs.

Non-Final Office Action mailed Dec. 19, 2005 in U.S. Appl. No. 10/128,657, 22 pgs.

Non-Final Office Action mailed Feb. 24, 2007 in U.S. Appl. No. 10/131,275, 13 pgs.

Non-Final Office Action mailed Apr. 19, 2007 in U.S. Appl. No. 10/131,275, 11 pgs.

Non-Final Office Action mailed Apr. 4, 2007 in U.S. Appl. No. 10/128,657, 16 pgs.

Non-Final Office Action mailed May 16, 2005 in U.S. Appl. No. 10/128,657, 25 pgs.

Non-Final Office Action mailed Jun. 1, 2005 in U.S. Appl. No. 10/131,274, 11 pgs.

Non-Final Office Action mailed Jun. 14, 2005 in U.S. Appl. No. 10/122,401, 34 pgs.

Non-Final Office Action mailed Aug. 17, 2004 in U.S. Appl. No. 10/122,401, 31 pgs.

Notice of Allowance mailed Apr. 2, 2007 in U.S. Appl. No. 10/122,401, 6 pgs.

Notice of Panel Decision from Pre-Appeal Brief review mailed Apr. 25, 2006 in U.S. Appl. No. 10/131,274, 2 pgs.

Office Communication mailed Jan. 29, 2007 in U.S. Appl. No. 10/122,401, 2 pgs.

Pre-Appeal Brief Request for Review mailed Apr. 6, 2006 in U.S. Appl. No. 10/131,274, 10 pgs.

Request for Continued Examination mailed Jan. 8, 2007 in U.S. Appl. No. 10/128,657, 21 pgs.

Request for Continued Examination and Amendment and Response mailed Jan. 26, 2007 in U.S. Appl. No. 10/131,272, 22 pgs.

Request for Continued Examination mailed Jun. 29, 2007 in U.S. Appl. No. 10/122,401, 4 pgs.

Request for Continued Examination mailed Jul. 6, 2006 in U.S. Appl. No. 10/131,274, 25 pgs.

Request for Continued Examination mailed Aug. 29, 2005 in U.S. Appl. No. 10/122,401, 27 pgs.

Bakker, G., *IP Aliasing*, [on-line]. Retrieved from the Internte: <URL: http://www.zone-h.org/files/24/ip_aliasing.txt>, (1993), 3 pgs.

Meth, K. Z., et al., "Design of the iSCSI protocol", *Proceedings of the 20th IEEE Conference on Mass Storage Systems and Technologies*, (Apr. 7-10, 2003), 116-122.

Satran, J., et al., "iSCSI", *IPS Internet Draft, draft-ietf-ips-iSCSI-12.txt.Category: standards - track*, (Apr. 17, 2002), 260 pgs.

Satran, J., et al., "iSCSI", *IPS Internet Draft, draft-ietf-ips-iSCSI- 00, Category: Standards Track*, [on-line]. Retrieved from the Internet: <URL: http://www.haifa.il.ilb.com/satran/ips/draft-ietf-ips-iSCSI-00.txt>, (Nov., 2000), 78 pgs.

Simitci, H., et al., "Evaluation of SCSP over TCP/IP and SCSI Over Fibre Channel Connections", *Hot Interconnects*, 9, (Aug., 2001), 87-91.

"U.S. Appl. No. 10/122,401, Notice of Allowance mailed Aug. 22, 2007", 6 p.

"U.S. Appl. No. 10/122,401 Response filed Feb. 28, 2007 to Examiner Communication mailed Jan. 29, 2007", 13 p.

"U.S. Appl. No. 10/128,657, Response filed Aug. 06, 2007 to Office Action mailed Apr. 04, 2007", 13 p.

"U.S. Appl. No. 10/128,657, Supplemental Amendment filed Oct. 04, 2007", 12 p.

"U.S. Appl. No. 10/131,274, Pre-Appeal Brief Request for Review mailed Apr. 6, 2006", 10 pgs.

"U.S. Appl. No. 10/131,274, Response filed Aug. 20, 2007 to Final Office Action mailed May 18, 2007", 12 p.

"U.S. Appl. No. 10/131,274, Non-Final Office Action mailed Sep. 27, 2007", 11 p.

"U.S. Appl. No. 10/131,275 Response filed Jun. 26, 2006 to Non Final Office Action mailed Feb. 24, 2006", 19 pgs.

"U.S. Appl. No. 10/131,275 Response filed Aug. 17, 2007 to Final Office Action mailed Apr. 19, 2007", 19 p.

"U.S. Appl. No. 11/748,966, Supplemental Preliminary Amendment filed Jul. 03, 2007", 12 p.

* cited by examiner

| APPLICATION TYPE | APPLICATION ID | CURRENT STATE | STATE TIMER VALUE | MONITOR RESULT FLAG | NEW CONFIG. FLAG | CONFIG. ID |
|---|---|---|---|---|---|---|
| 433 | 1037 | MASTER | 2 | 0 | 0 | 24 |
| 433 | 1234 | SLAVE | 2 | 0 | 1 | 6 |
| 433 | 4578 | CANDIDATE | 6 | 0 | 0 | 17 |
| 856 | 3296 | MASTER | 2 | 1 | 0 | 2 |
| 763 | 1037 | RESIGNATION | 0 | 0 | 0 | 3 |
| 763 | 9876 | MASTER | 2 | 0 | 0 | 14 |
| -- | -- | NULL | 5 | 0 | 0 | - |

FIG. 4

METHOD AND APPARATUS FOR EXCHANGING HEARTBEAT MESSAGES AND CONFIGURATION INFORMATION BETWEEN NODES OPERATING IN A MASTER-SLAVE CONFIGURATION

TECHNICAL FIELD OF THE INVENTION

The present invention relates generally to methods for managing execution of multiple applications within a networked, multi-processor system, and more specifically, methods for forming and exchanging heartbeat messages and configuration information between multiple, networked nodes, which execute applications using a master-slave configuration.

BACKGROUND OF THE INVENTION

In some computer systems, it is important to maximize the availability of critical services and applications. Generally, this is achieved by using a fault tolerant system or by using high availability ("HA") software, which is implemented on a cluster of multiple nodes. Both types of systems are described briefly in "A High-Availability Cluster for Linux," Phil Lewis (May 2, 2000).

A fault tolerant computer system includes duplicate hardware and software. For example, a fault tolerant server may have redundant power supplies, storage devices, fans, network interface cards, and so on. When one or more of these components fails, the fault is detected, and a redundant component takes over to correct the problem. In many cases, fault tolerant systems are able to provide failure recovery which is nearly seamless (i.e., unperceivable to system users). However, because these systems rely on duplicate hardware, they tend to be expensive. In addition, these systems typically are proprietary, and are tightly coupled to the operating system, whatever that system may be.

HA software also provides fault detection and correction procedures. In contrast to fault tolerant systems, HA software is implemented on two or more nodes, which are arranged in a "cluster" and communicate over a link (e.g., a network). Typically, one node operates as the "master" for a particular application, where the master is responsible for executing the application. One or more other nodes within the cluster are "slaves" for that application, where each slave is available to take over the application from a failed master, if necessary.

Generally, an HA software implementation is loosely coupled to the operating system, and therefore may be more portable to different types of systems and nodes than a fault tolerant system would be. However, one disadvantage to an HA system is that failure recovery typically takes much longer than it would with a fault tolerant system. Therefore, significant system downtimes may be perceived by system users.

One reason for the relatively slow failure recovery times is the way that failures are detected and responded to. In some systems, each slave periodically "pings" other nodes to determine whether they are reachable. If a slave determines that a master node is unreachable before expiration of a certain timeout period, the slave declares a failure and attempts to take over as master. Because this process relies on timeout periods and network communications, it provides slower recovery than is possible using fault tolerant systems. Besides being somewhat slower to recover, another disadvantage to these systems is that it is not possible to detect a failure of a single application within a master node. Instead, the entire node must fail in order for a failure to be detected.

Alternatively, a node within an HA system may periodically send out a "heartbeat" message for an application that it is executing as a master. The heartbeat message indicates that the master node continues to be able to execute the application. If a slave node does not receive a heartbeat message for a particular application within a certain timeout period, then the slave assumes that the master has failed, and an election process is initiated to determine which slave should take over as master.

The "Time Synchronization Protocol" (TSP) is an example of such an HA protocol, which is used by the clock synchronization programs timed and TEMPO. TSP is described in detail in "The Berkeley UNIX Time Synchronization Protocol," Gusella, et al. (1986). TSP supports messages for the election that occurs among slaves when, for any reason, the master disappears, as is described in detail in "An Election Algorithm for a Distributed Clock Synchronization Program," Gusella et al. (December 1985). Basically, the election process chooses a new master from among the available slaves when the original master ceases to send out heartbeat messages.

One major disadvantage to TSP is that synchronization messages are sent out at a very slow rate (e.g., on the order of once every several minutes). Therefore, if a master does fail, it may take several minutes for a slave to respond and conduct an election. This characteristic of TSP can result in an unacceptably slow assumption of master tasks.

The TSP protocol functions well in the context of supporting messages and elections that occur as part of a clock synchronization program. However, its portability to other types of applications is limited, and it is not well adapted to inclusion in modern systems for several reasons.

In modern networked computer systems, each machine may be capable of simultaneously running multiple applications, each of which is executed using a master-slave configuration. In such systems, it may be necessary to exchange status information between machines for each task and/or application. The primary limitation of TSP's application to modern systems is that TSP is capable of supporting message transfer for only a single application (e.g., a time daemon) per machine. Accordingly, TSP is not adapted to exchange status information for multiple tasks or applications between machines. In addition, when a task or application has updateable configuration information associated with it, TSP has no facility to monitor or support the transfer of new configuration information between nodes. Therefore, TSP is not an acceptable protocol for providing status and configuration messaging capabilities for modern networked computer systems.

What is needed is a protocol and method that can provide efficient failure recovery and configuration information exchanges between nodes of a networked computer system. Further needed is a protocol and method that is scalable and efficient, so that heartbeat and configuration messaging between nodes can be performed for potentially many tasks and applications without burdening the network (or networks) with excessive network traffic.

BRIEF DESCRIPTION OF THE DRAWING

FIG. 4 is an example of an application instance state table in accordance with one embodiment of the present invention;

DETAILED DESCRIPTION OF THE INVENTION

Various embodiments of the present invention provide methods for operating a node, within a networked computer system, which is capable of supporting communications with other nodes relating to operating multiple application instances in a master-slave configuration. The node maintains a state diagram for each application instance currently running in the master-slave configuration on the node and on the other nodes. In addition, the node listens for new application instances that are discovered on the node and on the other nodes. The nodes can be interconnected using multiple networks.

Each node occasionally sends out a "Heartbeat" message, which indicates the status of each master and/or slave that the node is operating or maintaining. In one embodiment, each Heartbeat message can include the status information for multiple masters and/or slaves. In addition, each node determines whether each application instance's configuration information is current, and requests new configuration information for an application instance when it is not current. When a node determines that it should no longer operate as a master for an application instance, the node can initiate a resignation process, during which another node will attempt to become the master for the application instance. In one embodiment, the node resigns to the last slave from which the node received a heartbeat.

Figure 1:
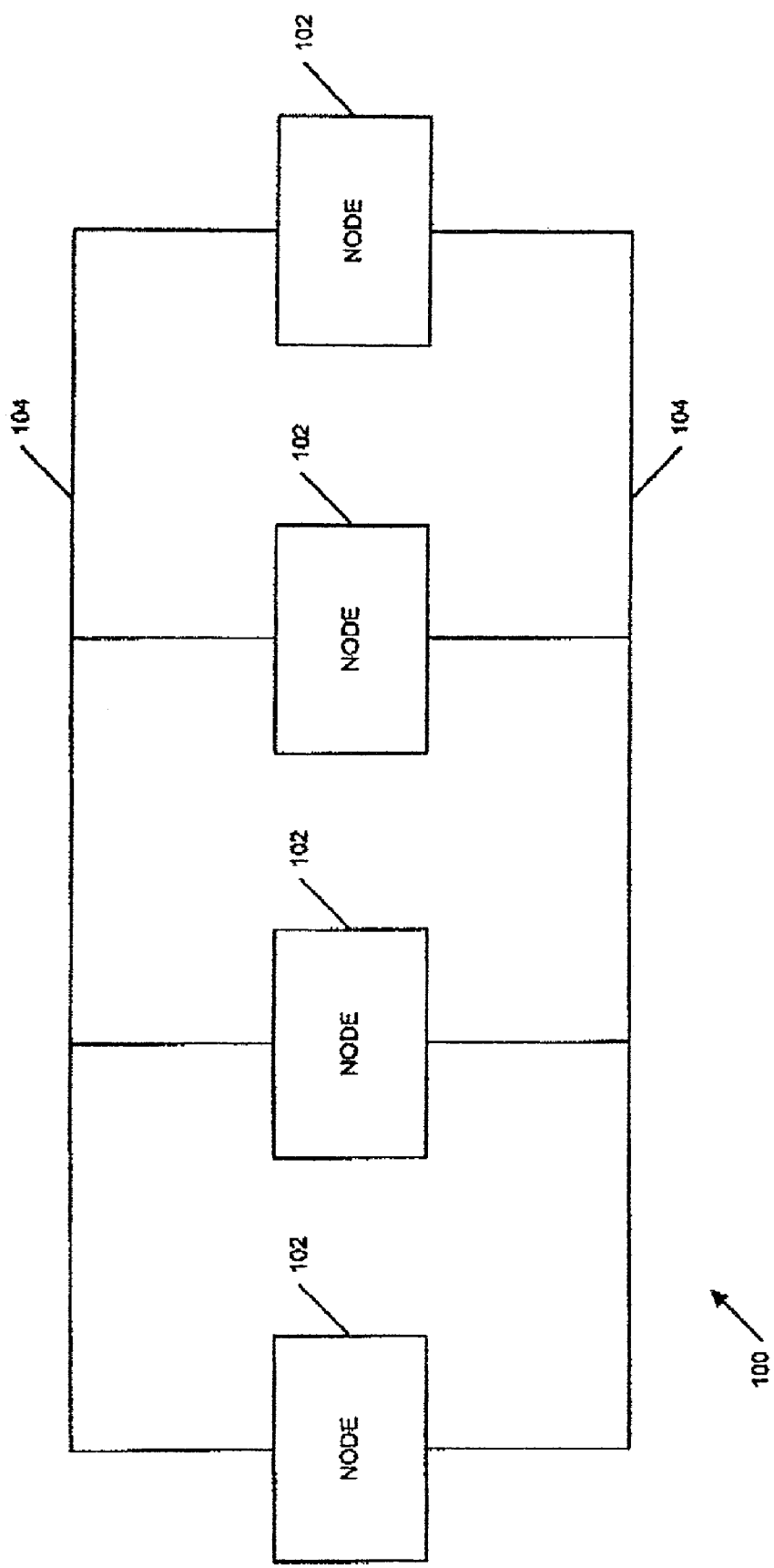
FIG. 1 illustrates a typical computer system within which the various embodiments of the present invention can be practiced.

FIG. 1 illustrates a typical computer system 100 within which the various embodiments of the present invention can be practiced. System 100 includes multiple nodes 102 interconnected by one or more communication networks 104. A "node," as used herein, refers to a distinct processing element of a computer system, which could be co-located with or remote from other nodes of the computer system. For example, some or all of the multiple nodes 102 could be stand-alone computers within a networked computer system. Alternatively, some or all of the multiple nodes 102 could be processors that are co-located within a single computer or facility, and which are networked together.

Although FIG. 1 illustrates four nodes 102 and two networks 104, a system could include more or fewer nodes interconnected by more or fewer networks 104. An advantage to interconnecting nodes 102 using multiple networks is that it provides hardware redundancy. This means that, if one network fails for any reason, nodes 102 still can communicate using the remaining one or more functioning networks.

Messages relating to operating in the master-slave configuration are referred to herein as "master-slave messages." In one embodiment, each node 102 sends some or all master-slave messages over multiple networks 104. Networks 104 could be any of various types of networks. For example, some or all networks 104 could be Ethernet links, DSL systems, telephone systems, the Internet, or combinations of these or other types of networks. In one embodiment, some or all of networks 104 are "bus" type networks, where each node connects to a single communication link. In bus type networks, when a node places a message on the network 104, the node 102 essentially "broadcasts" the message to all other nodes on the network 104. In another embodiment, some or all of networks 104 could be point-to-point networks, where message broadcasting is simulated.

Each node 102 includes one or more processors and one or more external network interfaces (e.g., ports). Each network interface allows a node 102 to send and receive messages from an external network 104. For example, a particular network interface could be an Ethernet port, fast Ethernet port, DSL port, or cable modem. In one embodiment, each network interface is a TCP/IP network interface, although other types of interfaces could be used, in other embodiments.

Each node 102 may be capable of running one or more different types of applications. In one embodiment, an application type can be virtually any type of software program that is executed using a master-slave configuration. For example, application types can include routers (e.g., IP and SCSI routers), login tasks, time synchronization tasks, and many other types of applications.

Some types of applications can initiate multiple "instances" of themselves on the same node, where an "application instance" is defined herein as a separately executable instance of a particular application type. An application instance can be, for example, a daemon, task, application program, or other type of software program that is executed by the node. For example, if a node is running an IP router, the node may simultaneously execute multiple instances of the router, where each instance is responsible for routing data between different destinations.

A node 102 that is primarily responsible for (i.e., actually "running") an application instance is considered a "master" for that application instance, and all other nodes 102 are considered "slaves" (or "backups") for that application instance. Any node 102 could be a master for one or more application instances, and/or a slave for one or more other application instances.

During steady state operations, only one master is present in the network for any particular application instance, and only the master actually executes the application instance's central task. The slaves, on the other hand, do not execute the application instance's central task, but are available to perform peripheral tasks and/or to take over the execution in the event that the master fails or resigns, for any reason. This situation is referred to as a "fail over," where one of the slaves becomes the master for a particular application instance.

In one embodiment, during steady state operations, each node is aware of all application instances being executed in the network. Each node executes a task for those of the application instances that the node is a master or a slave. For convenience, this task is referred to as a "main master-slave task" or "main task," although the term "task" is not meant to imply that the various embodiments are limited to use in any particular operating system. For the purposes of brevity and ease of description, the term "application instance" means any node function, operating system function, application or application instance whose communications relating to master-slave operation are being managed by a main task.

For each application instance, the main master-slave task on each node coordinates the transfer of state-related and "Heartbeat" messages between nodes, and also manages state transitions (e.g., master-to-slave, slave-to-candidate, etc.) in accordance with a defined state diagram.

Figure 2:
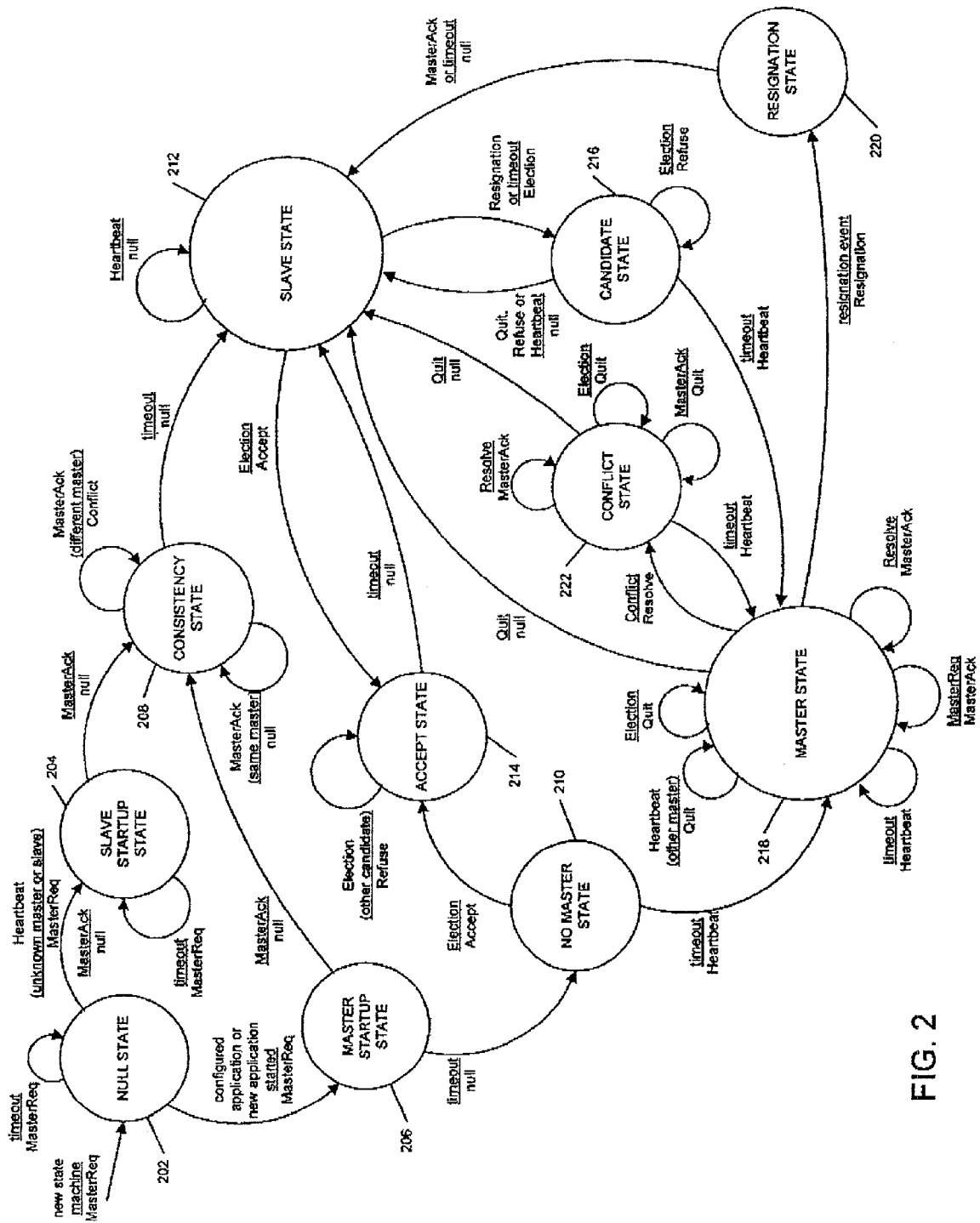
FIG. 2 illustrates a state diagram for a main master-slave task in accordance with one embodiment of the present invention.

FIG. 2 illustrates a state diagram for a main master-slave task in accordance with one embodiment of the present invention. In the figure, circles represent states, and arrows represent transitions. A transition may occur either upon the arrival of a message, the expiration of a timer, or the occurrence of some other event. These transition events are shown on the upper part of the labels superimposed on the arrows. The lower part of each label shows the message that the protocol sends at the time of the corresponding transition. A "null" label signifies that no message is sent or received. An arrow that loops back to the same state from which it originated signifies that no state transition is performed upon the occurrence of a particular event.

As will be evident from the description below, the embodiments of the present invention have several differences from and provide several advantages over the prior art TSP protocol. For example, the embodiments of the present invention are capable of managing execution of multiple application instances on the network's nodes, rather than simply managing a single time daemon on each node, as is performed by the prior art TSP protocol. In addition, the embodiments of the present invention provide efficient Heartbeat message and configuration information exchanges, as will be described in detail below.

Basically, these advantages are achieved by having each node maintain a state machine for each application instance for which the node is in a master state, a slave state, or another state. In addition, each Heartbeat message can include status information for multiple masters and/or slaves that the node maintains. Also, each node is capable of requesting updated configuration information for the application instances that the node maintains. Other distinctions between the embodiments of the present invention and the prior art will be pointed out, below, in conjunction with the description of each state.

Null State (State 202)

The Null State 202 is entered whenever a new state machine is initiated. A first state machine is initiated upon initialization (i.e., boot up) of the node. As will be described in more detail below, additional state machines are initiated for each configured application that is started manually or automatically upon boot up, and for each application instance running on another node that is detected by the node.

When the first state machine is initiated and enters the Null State 202, several things occur. First, a timeout period timer is initialized. Timeout period timers, referred to simply as "state timers," below, are associated with each of the various states, and each timer indicates how long before the node, for each application instance, should perform a particular action or move to another state, absent some other transition or event. In one embodiment, each state can have a different timeout period from the other states, or each state's timeout period can change from one initialization to another. In other embodiments, the timeout period can be pre-defined and/or specified manually by a user at a console, or can be adjusted based on various system parameters.

While in the Null State 202, the node listens for "Heartbeat" messages from other nodes, indicating that the other nodes are masters and/or slaves for various application instances. In one embodiment, each Heartbeat message can include from one to many "heartbeat segments," where each segment is associated with a master or slave application instance being executed from the remote node that sent the message. In other words, each heartbeat segment identifies an application instance being managed by the node. Heartbeat messages are described in detail, below, in conjunction with FIGS. 7–9.

In addition to listening for Heartbeat messages, the node initially sends out a Master Request (MasterReq) message over the network (or networks). The node also sends out a MasterReq message upon each expiration of the timeout period. The MasterReq message is intended to ask other nodes whether they are operating as a master for any application instances. If the node receives a Heartbeat message or a Master Acknowledgement (MasterAck) message from any node, indicating that another node is operating as a master for one or more application instances, then the state machine transitions to the Slave Startup State 204 for each of those application instances, which will be described in more detail below. If the node receives no Heartbeat message or MasterAck message within the timeout period, then the node remains in the Null State 202, reinitializes the timeout period timer, and continues to send out MasterReq messages. Once the node has discovered an application on the network, the node will not send out the MasterReq message anymore, in one embodiment.

In one embodiment, the node always has at least one state machine in the Null State 202, and that state machine is waiting to discover new application instances within the other nodes of the network. This state machine is referred to herein as an "idle state machine," indicating that it is idling until a new application instance is discovered.

The inclusion of the idle state machine in this embodiment provides an advantage over the prior art TSP protocol. The TSP protocol assumes that only one type of application instance exists within the node and within the other networked nodes (i.e., a time synchronization application). Accordingly, the TSP protocol promptly enters either the master state or slave state upon initiation of the application, and only one master or slave state machine is maintained by a node at any one time. The TSP protocol is incapable of managing multiple application instances on the nodes, or listening for new application instances on the network. In contrast, this embodiment of the present invention always has one or more state machines in the Null State 202, and so it can provide a new state machine whenever a new application instance is started in the node or is discovered in another node through the receipt of a MasterAck or Heartbeat message from that other node.

Slave Startup State (State 204)

The Slave Startup State 204 is entered from the Null State 202 when the node receives a Heartbeat or MasterAck message from another node, indicating that that other node is a master of an application instance that the node was not earlier aware of. If the node entered the Slave Startup State 204 in response to a Heartbeat message, the node sends out a MasterReq message, in an attempt to contact the master node for the application instance that the Heartbeat was received for.

If the node entered the Slave Startup State 204 in response to a MasterAck message, or if a MasterAck message is received before the expiration of a timeout period, then a transition occurs to the Consistency State 208, which will be described in more detail below. The node will then manage state transitions for that particular application instance, and a new, idle state diagram is initiated (i.e., started up in the Null State 202) to listen for other, new application instances on the network.

If no MasterAck message is received before the expiration of the timeout period, then it is assumed that there is no known master associated with the Heartbeat message, and the node remains in the Slave Startup State 204, periodically sending out MasterReq messages.

The Slave Startup State 204 enables this embodiment of the present invention to listen to the network and acquire every configured application instance that is active on the network. As will be described in more detail below, this enables the node to identify which other nodes can be failover candidates when a master application instance fails in the node, and also enables the node to identify master application instances on other nodes, so that the node can be a failover candidate for those other nodes.

Master Startup State (State 206)

The Master Startup State 206 is entered from the Null State 202 for each configured application that is automatically or manually initiated on the node. In other words, for each configured application and each application instance that is started after boot up (e.g., manually by a user at a console, or automatically in response to some event), a state machine is initiated, and that state machine enters the Master Startup State 206. Once in the Master Startup State 206, the node sends out a MasterReq message, in an attempt to determine whether a master already exists for the configured application instance.

If a MasterAck message is received before the expiration of a timeout period, then a transition occurs to the Consistency State 208, which will be described in more detail below. The node will then manage state transitions for that particular application instance, and a new, idle state diagram is initiated to listen for other, new application instances on the network.

If no MasterAck message is received before the expiration of the timeout period, then it is assumed that there is no known master associated with the application instance, and a transition occurs to the No Master State 210, as will be described below.

Consistency State (State 208)

The Consistency State 208 is entered from the Slave Startup State 204 or the Master Startup State 206. Before entering the Consistency State 208, the node should have received a MasterAck message from another node for a particular application instance. While in the Consistency State 208, the node waits for a timeout period to make certain that no other node is acting as a master for that application instance. During the timeout period, if the node receives a MasterAck message from a node identified in the previous MasterAck message, nothing happens. If the node receives a MasterAck message from another node, the node sends a Conflict message to the first identified master node. The Conflict message enables the first identified master node to work with the second identified master node to eliminate the anomalous condition. If no MasterAck message is received from another node during the timeout period, then the node transitions to the Slave State 212.

No Master State (State 210)

The No Master State 210 is entered from the Master Startup State 206, after it is determined that no other master exists for a particular application instance. The No Master State 210 is intended to handle cases where the state diagram will not transition to the Master State 218, but will instead transition to the Accept State 214. The Master State 218 and the Accept State 214 are described in more detail below.

The state diagram will send out an Accept message and transition to the Accept State 214 if, during a timeout period, the node receives an Election message, described below, from another node that is acting as a slave for the particular application instance. If an Election message is not received within the timeout period, then the node sends out a Heartbeat message, and the state diagram transitions to the Master State 218.

Slave State (State 212)

The Slave State 212 is entered from the Consistency State 208 or the Accept State 214, when a known master exists elsewhere on the network. The Slave State 212 is a stable state, meaning that if the associated application instance, the node, and the network are in a steady state (e.g., the node continues to receive Heartbeats from the master for the application instance), then the node remains in the Slave State 212 for the duration of application instance.

Normally, a node periodically sends out a Heartbeat message, which indicates that each master and/or slave associated with the node is functioning properly, and the node is able to continue serving as the masters and/or slaves for the application instances. Consequently, each node in the Slave State 212 for an application instance expects to receive a Heartbeat message on a roughly periodic basis, as well, where the Heartbeat message indicates that the master is functioning properly. In one embodiment, the node expects to receive such a Heartbeat message prior to expiration of a slave state timer. Each time the node receives a Heartbeat message indicating that the master is functioning properly, the slave state timer is reset, and the node remains in the Slave State 212 for the application instance.

If the slave state timer expires, and the node has not received a Heartbeat message that indicates proper master functioning, then the node assumes that the master has malfunctioned. At that time, the state diagram transitions to the Candidate State 216, and initiates an election process to try to become the new master for the application instance. The node may also transition to the Candidate State 216 and initiate an election if the node receives a Resignation message from the master, indicating that the master wants to relinquish its status as master. As will be described later in conjunction with the Candidate State 216, if the slave fails to win the election, it returns to the Slave State 212. Otherwise, it enters the Master State 218.

Besides receiving Heartbeat messages, for each application instance in the Slave State 212, the node periodically transmits (e.g., upon expiration of the state timer) a Heartbeat message over one or more of the networks to which the node is attached. In one embodiment, each Heartbeat message includes status information for each slave (and master, as described below) being managed by the node. Accordingly, the Heartbeat message indicates that the node is still capable of being a slave for an application instance.

While in the Slave State 212, the node also could receive an Election message from another slave that is trying to become the master for the particular application instance. If this occurs, the node sends an Accept message, and the state diagram transitions to the Accept State 214, described below.

The timeout period of the Slave State is defined, in one embodiment, as a multiple of the timeout period used to send a Heartbeat message. In doing so, the occasional loss of a Heartbeat message will not cause a Slave State timeout. In other embodiments, the timeout period could be some value other than a multiple of the timeout period used to send a Heartbeat message.

Furthermore, in one embodiment, when the Slave State timer is reset upon the arrival of an appropriate Heartbeat message, a new Slave State timeout period value is selected. In one embodiment, the new Slave State timeout period is selected as a minimum value plus a random (or semi-random) value. For example, the new Slave State timeout period could be selected as a minimum value of one (or multiple) Heartbeat timeout period plus a value within a range of 1–100 Heartbeat timeout periods, although other minimum values and/or ranges could be used as well. In another embodiment, the Slave State timeout period selection process is not random. Desirably, the selection process results in a high probability that the various nodes in the Slave State for the same application instance will not timeout at the same time. Because one slave is likely to timeout before any other slave times out, the use of a variable timeout period is likely to speed up any election process which may occur by limiting the number of candidates, preferably to only one.

Accept State (State 214)

The Accept State 214 is used, in part, to facilitate conduction of an election over the network. The Accept State 214 is entered from the No Master State 210 or from the Slave State 212 when an election is taking place on the network, as indicated by an Election message from a candidate node. During the Accept State 214, the node will not attempt to become a master. In other words, the node "accepts" the fact that another node is attempting to become a master. If, during a timeout period, the node receives an Election message from another candidate, the node sends a Refuse message. After the timeout period expires, a transition to the Slave State 212 occurs.

Candidate State (State 216)

The Candidate State 216 is entered from the Slave State 212 when the node receives a Resignation message from a master, or when a master's Heartbeat has not been received within the slave state timeout period. Either way, the node sends out an Election message, which institutes an election process. During the election process, the node attempts to become the new master of the application instance.

Figure 3:
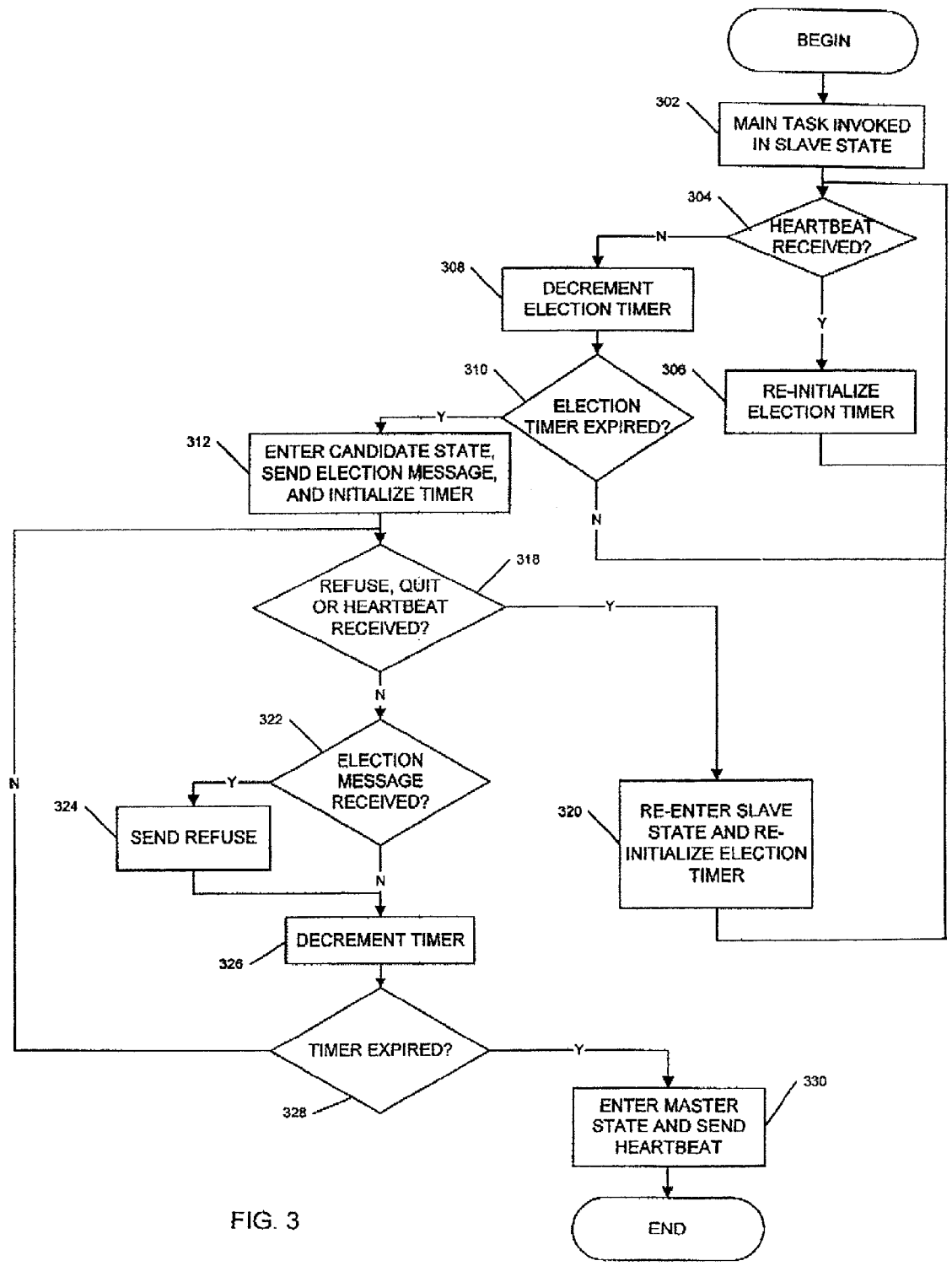
FIG. 3 illustrates a flowchart of a method for a slave to initiate and conduct an election in accordance with one embodiment of the present invention.

FIG. 3 illustrates a flowchart of a method for a slave to initiate and conduct an election in accordance with one embodiment of the present invention. In one embodiment, the method is performed by the main master-slave task. Blocks 302–310 represent processes that occur while the node is in the Slave State (212, FIG. 2), and blocks 312–328 represent processes that occur while the node is in the Candidate State (216, FIG. 2).

The method begins, in block 302, after the main task has been invoked and the node is in the Slave State for an application instance. The main task could be invoked periodically or also upon the receipt of a message. Therefore, a determination is made, in block 304, whether a Heartbeat message has been received from another node that is operating as the master for the application instance. If a Heartbeat message has been received, the main task re-initializes the Slave State election timer for the application instance, in block 306.

If a Heartbeat message has not been received, and the main task has been invoked at a periodic interval, the main task decrements the Slave State election timer, in block 308, and determines, in block 310, whether the election timer has expired. If the election timer has not expired, the method iterates as shown. If the election timer has expired, the node enters the Candidate State (216, FIG. 2), in block 312. When entering the Candidate State, the node broadcasts an Election message, and initializes a Candidate State timer, which indicates how long the node should stay in the Candidate State.

Occasionally, the main task may be invoked before expiration of the Candidate State timer. When invoked, the main task determines, in block 318, whether the node has received a Refuse message, a Quit message, or Heartbeat message from another node that has entered the Master State for the application instance.

If the node has received a Quit or Heartbeat message from another node, it indicates that the other node is already operating as master for that application instance. Similarly, if the node receives a Refuse message from another node, it indicates that another node has previously called an election, and is attempting to become master for the application instance. In these cases, the node re-enters the Slave State, in block 320, re-initializes the election timer, and the method iterates as shown.

If a Refuse, Quit or Heartbeat message has not been received, the main task determines, in block 322, whether an Election message has been received from another node during the timeout period. If so, the node sends a Refuse message to the other node, in block 324, causing the other node to return to its Slave State 212 for the application instance.

If an Election message has not been received, and the main task has been invoked at a periodic interval, the main task decrements the Candidate State timer, in block 326. The main task then determines, in block 328, whether the timer has expired. If not, the procedure iterates as shown. If the timer has expired, the node enters the Master State for the application instance, in block 330, sends out a "single instance" Heartbeat message, and the method ends.

Master State (State 218)

Referring back to FIG. 2, the Master State 218 typically is entered from the No Master State 210 or the Candidate State 216 when no other master is found for an application instance or when the node, after being a slave for the application instance, has won an election to become master. Similar to the Slave State 212, the Master State 218 is a stable state, meaning that if the associated application instance, the node, and the network are in a steady state, then the node remains in the Master State 218 for the life of the application instance.

For each application instance in the Master State 218, the node periodically transmits (e.g., upon expiration of a state timer) a Heartbeat message over one or more of the networks to which the node is attached. In one embodiment, each Heartbeat message includes status information for each master and slave being managed by the node. Accordingly, the Heartbeat message indicates that the node is operating properly with respect to each master and slave application instance (i.e., the Heartbeat message can have status information for multiple instances). In addition, in one embodiment, the node transmits a "single instance" Heartbeat message at the time that an application instance is promoted to the Master State 218. Because the single instance Heartbeat messages are sent upon promotion to the Master State 218, in one embodiment, their transmission is not periodic in nature, as is the case with the multiple instance Heartbeat messages.

In one embodiment, the nodes alternate to which network the Heartbeat message is sent out on, assuming the node is connected to more than one network. This reduces the amount of traffic going out on a single network. In other words, a single network is not responsible for bearing all of the Heartbeat message traffic. In another embodiment, the node could send the Heartbeat messages out over one particular network without alternating. Alternatively, the node could send them out over more than one network at a time.

The node can transition out of the Master State 218 for several reasons: 1) the node receives a Quit message from another master; 2) the node detects a Conflict message from another node; or 3) a failure of the application instance or the node is imminent or has occurred. Each of these cases are discussed below.

If the node receives a Quit message from another node, it means that some other node is operating as the master for the application instance. A state transition then occurs directly to the Slave State 212, and the node then acts as a slave for the application instance.

While in the Master State 218, if the node receives a Conflict message, the node sends out a Resolve message, and a transition to the Conflict State 222 occurs. A Conflict message indicates that one or more other nodes are attempting to act the master for the application instance. The node broadcasts the Resolve message to determine the identity of the other master, so that the node can force the other node into the Slave State. As will be described in conjunction with the Conflict State 222, described below, if the node successfully forces the other master into the Slave State, then a transition back to the Master State 218 occurs. Otherwise, the node becomes a slave for the application instance.

The node also may transition out of the Master State 218 if the application instance, application, or node is or soon will be operating improperly. In one embodiment, a monitor task, described later, periodically checks to see how the various application instances in the master state are running. The application instance health is indicated by criteria that the application instance provided upon registering itself. If the application instance is not running properly according to the criteria, or some other resignation event occurs, the monitor task sends a message to the main master-slave task. The main task then causes the node to send out a Resignation message, and a state transition to the Resignation State 220 occurs, as will be described in more detail below.

The node may respond to several other messages while in the Master State 218. First, if the node receives a Heartbeat message or an Election message from another node that is operating as a master or attempting to become a master of the application instance, the node sends a Quit message to that other node, in an attempt to force the other node into the Slave State. In addition, if the node receives a MasterReq message from another node, the node sends a MasterAck message that identifies the node to the other node. Finally, if the node receives a Resolve message from another node, the node sends a MasterAck message, indicating that the node considers itself to be the master for the application instance.

Resignation State (State 220)

The Resignation State 220 is entered from the Master State 218 when a resignation event occurs, and the node will no longer function as the master for an application instance. In one embodiment, resignation events are detected by the monitor task and reported to the main task.

A resignation event can be a failure of an application instance, an out of tolerance condition, a manual interruption (e.g., by a user at a console), or any other event that indicates the application instance is not or soon will not be operating properly. In one embodiment, the monitor task can be used to initiate a resignation of any or all application instances in the Master State 218 if the health of the node, the operating system, or any particular application deteriorates. For example, the monitor task can periodically check the status of a temperature sensor within the node. If the sensor indicates that the temperature is too high, the task can send a message to the main master-slave task, which then causes all tasks in the Master State 218 to transfer to the Resignation State 220. As another example, the monitor task or another task can periodically call the operating system to check some operating system criteria, such as the system throughput. If the criteria indicate that the operating system is functioning below an acceptable level, the monitor task can send a message to the main task, which can cause some or all application instances in the Master State 218 to transfer to the Resignation State 220, as well.

After a resignation event occurs, the application instance (or instances) enters the Resignation State 220, sends a Resignation message over one or more networks, and initializes a Resignation State timer. In one embodiment, the Resignation message is only sent to one other node. In another embodiment, the Resignation message could be sent to multiple nodes or broadcast, with an indication as to which other node should initially attempt to become the master for the application instance. Without such an indication, multiple nodes may simultaneously attempt to become master. The Resignation message informs one or more other nodes in the Slave State for the application instance that an election should be held to elect a new master. After expiration of the Resignation State timer, the node will enter the Slave State for the application instance (or instances).

Referring back to Resignation State 220, if a MasterAck message has not been received, and the main task has been invoked at a periodic interval, the main task decrements the Resignation State timer. The task then determines whether the timer has expired. After expiration of the Resignation State timer, the node will enter the Slave State 212 for the application instance (or instances). If the main task is invoked before expiration of the Resignation State timer, the main task may determine that the node has received a MasterAck message from another node that has entered the Master State for the application instance. If so, the node enters the Slave State 212.

Conflict State (State 222)

The Conflict State 222 is entered from the Master State 218 when a Conflict message is received from another node. As described previously, a Conflict message indicates that the other node detected one or more other masters for the application instance.

Upon receipt of the Conflict message, the node sends out a Resolve message and initializes a Conflict State timer. The Resolve message requests the identity of the other master. Once the identity of the other master is determined, through receipt of a MasterAck message, the node sends out a Quit message to that other master, and eventually returns to the Master State 218. If the node does not receive the identity of the other master within the timeout period, the node returns to the Master State 218, as well. Alternatively, if the node receives a Quit message from the other master, the node transitions to the Slave State 212 for the application instance.

The node may respond to several other messages while in the Conflict State 222. First, if the node receives a MasterAck message or an Election message from another node that is operating as a master or attempting to become a master of the application instance, the node sends a Quit message to that other node, in an attempt to force the other node into the Slave State. In addition, if the node receives a Resolve message from another node, the node sends a MasterAck message, indicating that the node considers itself to be the master for the application instance.

Now that a state diagram of a master-slave state machine has been described, various aspects and details of the present invention will be further depicted by FIGS. 4–13 and the associated description, below. First, the operation of the main master/state task will be described in conjunction with FIGS. 4–5.

Briefly, the main master-slave task is initialized upon boot up of the node or later. In one embodiment, the main task is then periodically invoked, and also invoked in response to receipt of a message, as will be described in detail below. The major functions of the main task are:

1) to initiate and maintain state machines for application instances operating in the master-slave configuration across the network (including one additional state machine in the Null State 202, FIG. 2); and
2) to respond to state timer timeouts, messages, and other events.

Initialization of the main task includes the creation of a table, referred to herein as an "application instance state table" or "state table." The application instance state table indicates the current state of each application instance, across the network, which is being operated in the master-slave configuration. Accordingly, in one embodiment, the state table enables the main task to perform the first of its major functions, which is initiating and maintaining state machines for application instances across the network.

FIG. 4 is an example of an application instance state table 400 in accordance with one embodiment of the present invention. For each application instance, the table 400 has a field for the application type 402, application instance identifier (application ID) 404, current state 406, state timer value 408, and monitor result flag 410, in one embodiment. In another embodiment, each entry of the table 400 has a new configuration flag 414, and a configuration ID 416. As shown in FIG. 4, the application type 402, application ID 404, state timer value 408, new configuration flag 414, and configuration ID 416 are designated with integers, and the current state 406 is designated with ASCII values, although they could be designated with other types of characters (e.g., other types of arrays of signed or unsigned characters, or binary or hexadecimal values).

In one embodiment, each application instance is defined by two items of information: the application type 402; and the application ID 404. As its name implies, the application type 402 indicates the type of application (e.g., SCSI router, IP router, or other types) that the application instance corresponds to. In one embodiment, the designators used for the application type 402 are globally known, but they might not be, in another embodiment.

The application ID 404 is an identifier that uniquely identifies each application instance of a particular type to all nodes of the network. For example, the entry 420 having application type "433" has application ID "1037." All nodes of a particular type would be able to uniquely identify the application instance by the application type "433" and application ID "1037." Therefore, the combination of the application type 402 and application ID 404 enables the various nodes to communicate regarding particular application instances. In another embodiment, in which only one application type exists, the application type 402 is not used, and instead the node uses only the application ID 404 to identify the application instance. As indicated by entries 420 and 424, identical application IDs 404 can be assigned if their application types 402 are different. Thus, entries 420 and 424 have identical application IDs of "1037," but different application types of "433" and "763," respectively.

The current state 406 indicates the state, within the state diagram shown in FIG. 2, that each application instance is currently in. The state timer value 408 indicates what the value of the state timer is for the application instance in that particular state. For example, entry 420 indicates that application type "433" and instance "1037" is in the Master State, and that its state timer has a value of "2." In one embodiment, each application instance in the Master State is synchronized to the same value. In the example shown, entries 420, 422, and 426 are in the Master State, and each of these entries currently has a state timer value of "2." In another embodiment, application instances in the Master State do not have synchronized state timer values.

Having synchronized Master State timers facilitates creation of a multiple instance Heartbeat message, in accordance with one embodiment of the present invention. As described previously, when the Master State timer expires, a Heartbeat message is sent out for the master. By synchronizing all Master State timers within a node, all Master State timers will expire at the same time, and a single Heartbeat message can include status information for all the masters.

In one embodiment, each Slave State timer also is synchronized with the Master State timers. Accordingly, in the example shown, entry 421, which is in the Slave State, has a state timer value of "2." By synchronizing the master and slave state timers, status information for each managed slave also can be included in the same Heartbeat message as the master status information. In another embodiment, Slave State timers are synchronized with each other, but not with the Master State timers. In this embodiment, a Heartbeat message with the slave status information can be sent out for all of the slaves, and a separate Heartbeat message with the master status information can be sent out for all of the masters. In still other embodiments, either the master or slave state timers could be non-synchronized, and separate Heartbeat messages could be sent out for each application instance, or a multiple instance message could be sent for the masters or slaves that happen to expire at the same time.

When a state timer value 408 has been decremented to "0," some event typically occurs (e.g., the timer is re-initialized, a state transition occurs, and/or a message is sent out). For example, entry 424 is shown in the Resignation State (220, FIG. 2), with a state timer value of "0." Referring also to FIG. 2, this means that the application instance is about to transition to the Slave State (212, FIG. 2).

In one embodiment, each entry in the application instance state table 400 also includes a monitor result flag 410. This flag is used to indicate that a problem has occurred with a master. For example, as will be described in more detail in conjunction with FIG. 11, the flag 410 could be set by the monitor task or other software if a problem has occurred, and the flag could be cleared if no problem has been detected. If the flag indicates that a problem has occurred, then the master task can determine whether a slave is available to take over master operations, as will be described in more detail in conjunction with FIG. 5.

As mentioned previously, each slave attempts to maintain the most up to date configuration information, in one embodiment. Maintenance of current configuration information enables a slave to more rapidly take over as a master, if the need arises. Accordingly, in one embodiment, each entry in the application instance state table 400 also includes a new configuration flag 414 and a configuration ID 416.

These fields enable a node to determine whether or not the configuration information has changed for the corresponding application instance. A configuration change would be a change of the configuration information that is used by the master, and which should be used by the slaves, for a particular application instance. In one embodiment, a configuration change is indicated by the new configuration flag 414 corresponding to the selected entry. In other embodiments, a configuration change could be indicated by some other stored indicator or by a received message. As will be described in more detail in conjunction with FIGS. 10 and 12, the new configuration flag 414 is set during evaluation of a received Heartbeat message (see block 1022, FIG. 10), and is cleared by a new configuration task after the new configuration information has been received (see block 1214, FIG. 12).

The configuration ID 416 includes a value that uniquely identifies the most current configuration version that a node should be able to access. This enables the node to obtain the most current configuration version in the event that the new configuration flag 416 indicates that the node does not currently have the most current version.

Entries for various application instances are added to the table 400 upon boot up of the node, and also later, as various application instances are started on the node or discovered on the network. Once added to the table, an application instance is referred to herein as a "registered application instance." In order for an application instance being run on the node to register itself, the application instance sends a message to the main task, which includes the application ID for the application. The main task, in turn, creates a table entry in the state table 400 for each of these "configured applications" (i.e., applications that are initialized and registered upon boot up). During operation, the main task can create new table entries, as well, for applications or application instances that are detected in other nodes, or that are started (e.g., automatically or from a console connected to the node) and register themselves after boot up.

As described previously, the node also maintains one entry (e.g., entry 428) in the Null State (202, FIG. 2), which is waiting to detect a new application instance within the node or elsewhere on the network. This entry corresponds to a "null application instance," and not to any particular application type. Accordingly, the application type 402 and application ID 404 fields can be null or blank for this entry. Once a new application instance is discovered, the Null State entry 428 will be assigned an application type 402 and application ID 404, and it will be transitioned out of the Null State to either the Slave Startup State (204, FIG. 2) or the Master Startup State (206, FIG. 2). A new Null State entry is then added to the table. As the above description indicates, state machines for application instances are initiated by adding entries to the state table 400.

Besides being defined by the application type and application ID, each application instance is also defined by a "cluster identifier" (cluster ID), in another embodiment. The cluster ID indicates to which "cluster" of application instances the particular application instance belongs. The concept of clusters enables grouping of application instances and/or application types.

The main master-slave task is executed periodically, and also can be executed upon the occurrence of some event (e.g., a monitor, resignation or message event). Basically, the main master-slave task is responsible for managing state transitions, and for receiving, processing, and sending out Heartbeat and other messages. This is achieved, in one embodiment, using an application instance state table, such as the table 400 described in conjunction with FIG. 4.

Figure 5:
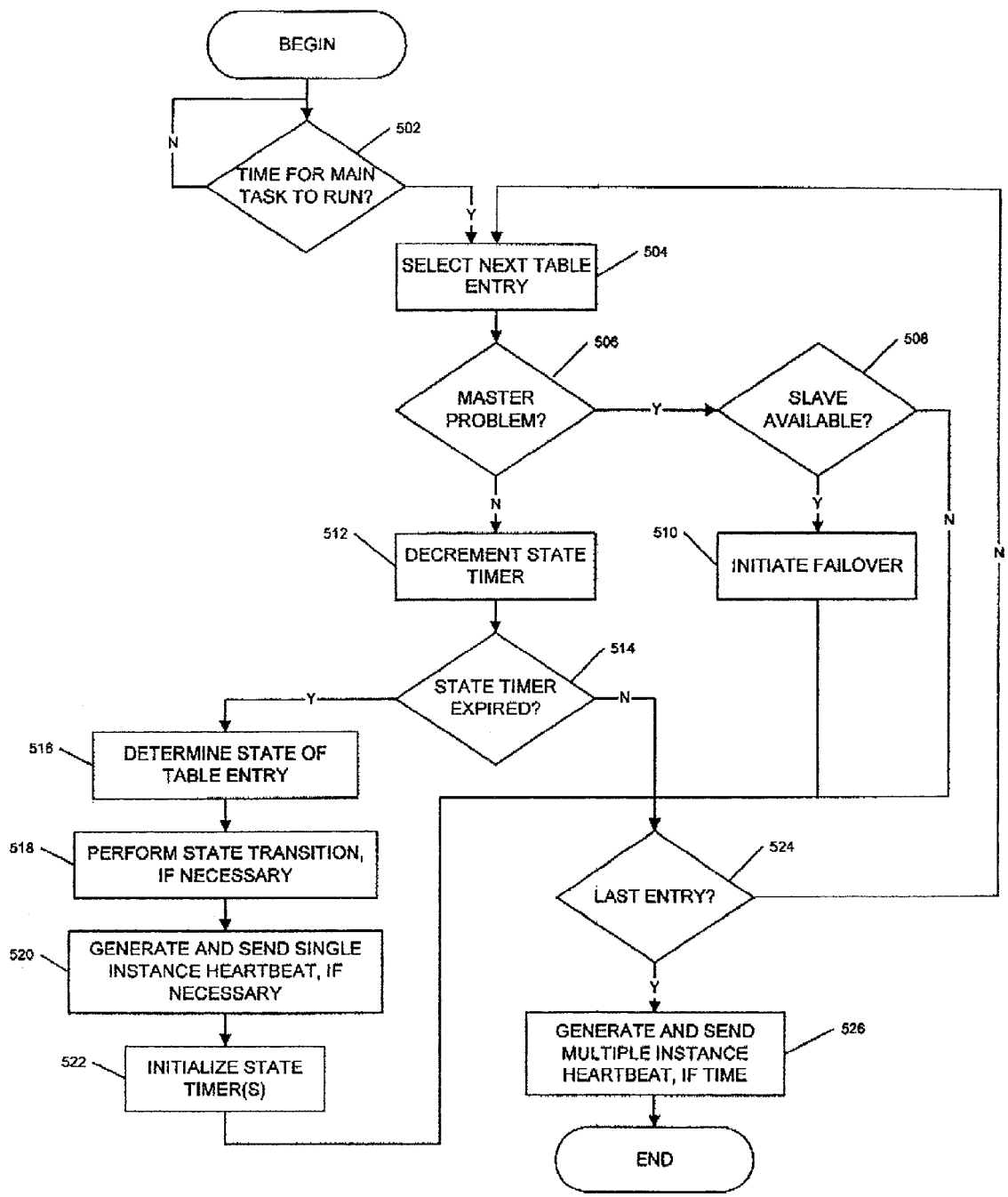
FIG. 5 illustrates a flowchart of a method for a main master-slave task to execute periodically in accordance with one embodiment of the present invention.

FIG. 5 illustrates a flowchart of a method for a main master-slave task to execute periodically in accordance with one embodiment of the present invention. The method begins, in block 502, after it is determined that it is time for the main task to run. In one embodiment, the task is periodically initiated upon expiration of a system timer, referred to herein as a "watchdog timer," which is re-initialized after it expires. The initialization value of the watchdog timer could be any value within a wide range of values. For example, the value could be within a range of 100–500 microseconds, although it could be larger or smaller as well. In one embodiment, the initialization value of the watchdog timer is some fraction of the time that a Heartbeat message will be created and sent out. For example, a Heartbeat message could be sent after 10 expirations of the watchdog timer, although the message could be sent after greater or fewer (e.g., as few as 1) expirations of the watchdog timer, as well.

The main task selects, in block 504, the next entry in the application instance state table (e.g., table 400, FIG. 4). In one embodiment, entries are evaluated in a top-down, sequential order, although the entries could be evaluated in a different order as well. A determination is then made, in block 506, whether the selected entry corresponds to an application instance in the master state and, if so, whether the monitor result flag (e.g., flag 410, FIG. 4) indicates that a problem has occurred with the master. For example, the flag could be set if a problem has occurred, and the flag could be cleared if no problem has been detected.

If the flag indicates that a problem has occurred, then a determination is made, in block 508, whether a slave is available to take over master operations. The node would know whether a slave were available if it had received a Heartbeat message for one or more slaves in the past. If a slave is available, then the node initiates a failover, in block 510, by sending out a Resignation message, described previously in conjunction with FIG. 2 and the Resignation State 220. In one embodiment, the node fails over to the last slave that it received a Heartbeat from. Alternatively, the node could fail over to any available slave. If no slave is available for the application instance, the node does not initiate a failover. The method then proceeds to block 524, described later.

If no problem is detected in block 506, then the main master-slave task decrements the state timer (408, FIG. 4) for the next table entry, in block 512. A determination is made, in block 514, whether the state timer has expired (e.g., whether it has been decremented to zero or less). If not, the main task proceeds to block 524, which will be described below. If so, the main task determines the current state (406, FIG. 5) of the application instance corresponding to the entry, in block 516.

Based on the current state, the main task then performs a state transition, if required, in block 518. The particular state transition performed by the main task depends on the state that the application is currently in, as was described in detail in conjunction with FIG. 2. For example, if the application instance is in the No Master State (e.g., state 210, FIG. 2) when the state timer expires, the main task would then promote the application instance to the Master State (e.g., state 218, FIG. 2) by changing the current state field (e.g., field 406, FIG. 4).

In block 520, the main task then generates a single instance Heartbeat or other message, if required. The main task also sends out the message, in one embodiment. In an alternate embodiment, the main task can wait and send out the message at a later time.

A single instance Heartbeat message is warranted when an application instance is newly promoted to the Master State. A single instance Heartbeat message is a Heartbeat message that includes status information for only a single application instance (i.e., the application instance currently being evaluated). For example, the instance being evaluated could have just been promoted, in block 518, from the No Master State (e.g., state 210, FIG. 2) to the Master State (e.g., state 218, FIG. 2) because the No Master State timer expired. Although the new master's heartbeat information will be included in the next multiple instance Heartbeat message, it is desirable to rapidly send out a Heartbeat message that indicates that the node is now the master, rather than waiting until it is time to generate the multiple instance message. This reduces the likelihood that another node will try to become the master for the application instance, because the other nodes will immediately be informed that a new master exists. Generation of a single instance Heartbeat message is described in detail in conjunction with FIG. 6, below. Besides Heartbeat messages, the main task may generate and send out other messages as well. For example, referring to FIG. 2, the main task may send out a MasterReq message (e.g., from Slave Startup state 204) or some other message.

The main task then initializes the expired state timer or the state timer of the newly entered state, in block 522. The state timer could be set to some set, pre-defined or semi-random value. For example, the initialization value for the Slave Startup State (e.g., state 204, FIG. 2) timer could always be the same pre-defined value, although it is not necessarily so. Contrarily, the initialization value for the Slave State (e.g., state 212, FIG. 2) timer could be selected from a range of values, as was described previously in conjunction with FIG. 2.

Alternatively, the state timer could be set to a value that is synchronized with one or more other state timers. For example, in one embodiment, the state timers for every application in the Master State and the Slave State are synchronized to the same value. This results in the state timers for each of the master and slave state timer then expires at the same time (i.e., during the same execution of the main master-slave task). Because a Heartbeat message is sent out for an application instance upon expiration of a master (or slave) state timer, when all master and/or slave state timers expire at the same time, a single Heartbeat message can include status information for all of the master and/or slave application instances.

If the state timer has not expired, as determined in block 514, or after initializing the state timer, in block 522, the main task determines whether the application instance state table entry just evaluated was the last entry of the table, in block 524. If not, the procedure iterates as shown, and the main task evaluates the next entry in the table.

If the last entry has been evaluated, then a multiple instance Heartbeat message is completed and sent, in block 526, if it is time for such a message to be sent. For any master application instances that had a problem, as detected in block 506, a heartbeat segment would be excluded from the Heartbeat message. Generation of a multiple instance heartbeat message is described in conjunction with block 526 and with FIG. 7, below.

In one embodiment, it is time to send a multiple instance Heartbeat message when the state timers for one or more application instances in the Master and/or Slave State have expired. As was described previously, the state timers are synchronized for each application instance in the Master and Slave states, in one embodiment. Accordingly, each of these state timers expires at the same time (i.e., during the same execution of the main task), and it is possible to send out one Heartbeat message that includes status information for all the master and slave application instances. By sending one Heartbeat message, rather than separate messages for each master and/or slave, network traffic is substantially reduced.

In an alternate embodiment, the Master State timers are synchronized with each other, and the Slave State timers are synchronized with each other, but they are not synchronized together. In such an embodiment, one Heartbeat message could be sent out for the masters, and another Heartbeat message could be sent out for the slaves. In still another alternate embodiment, two or more multiple instance Heartbeat messages could be sent out. For example, if the number of masters and/or slaves within a node would result in a Heartbeat message that is too large for the network protocol to support, the statuses for some (i.e., fewer than all) masters and/or slaves could be reported in one Heartbeat message, and the statuses for the remaining masters and/or slaves could be reported in one or more additional Heartbeat messages.

Although the multiple instance Heartbeat message is shown to be completed and sent at the end of the process depicted in FIG. 5, the message could be completed and/or sent at an earlier time, in other embodiments. For example, the first time a table entry is encountered with an expired Master or Slave State timer, the method could step through all remaining table entries to identify the remaining masters and/or slaves. Then, during block 520, the method could generate the multiple instance Heartbeat message and, if desired, send the Heartbeat message out.

After block 526, the main task ends. The main task is then later initiated again upon expiration of the watchdog timer or upon the occurrence of some message event, as described below.

Figure 6:
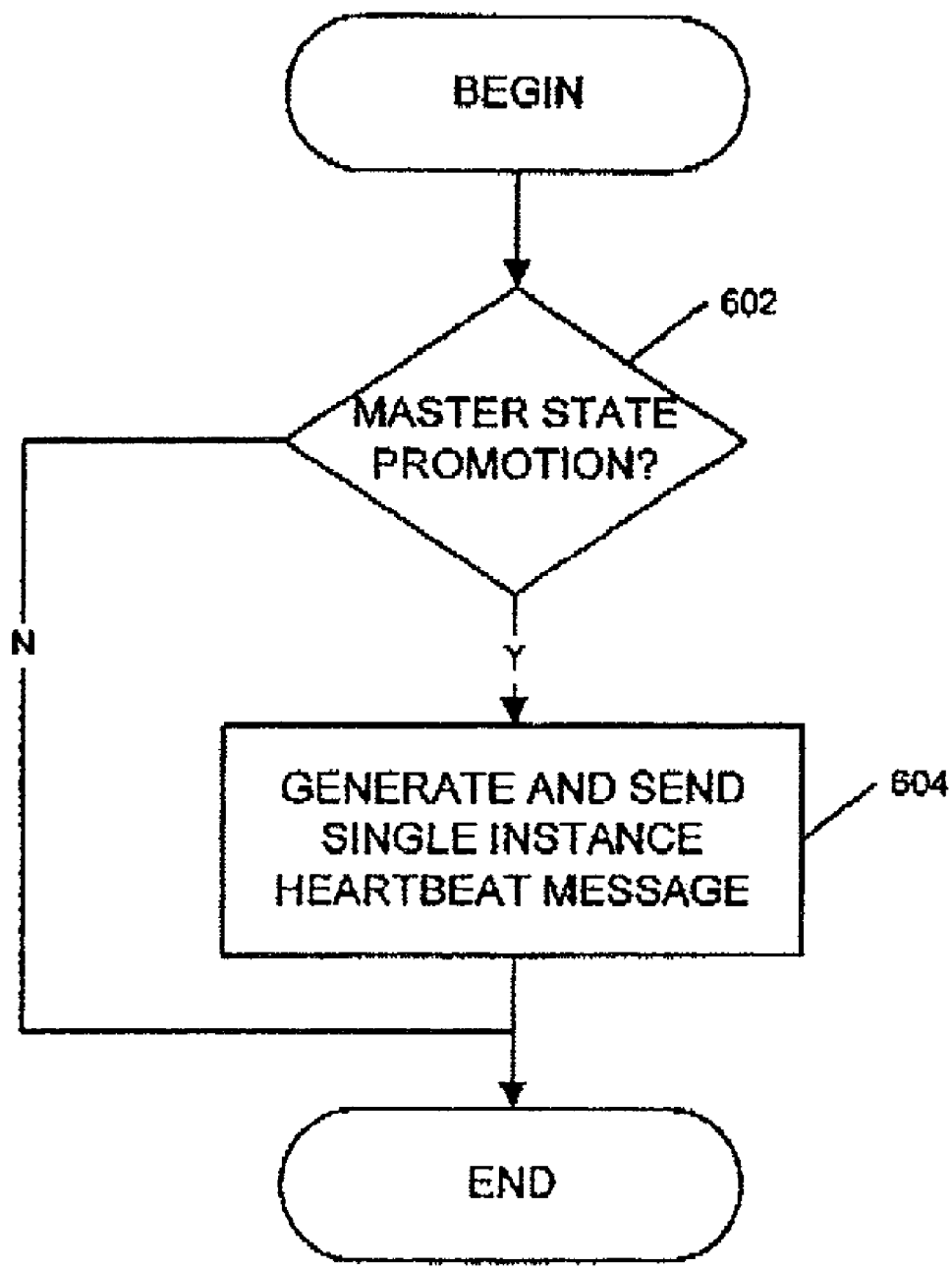
FIG. 6 illustrates a flowchart of a method for a node to generate and send a single instance Heartbeat message in accordance with one embodiment of the present invention.

FIG. 6 illustrates a flowchart of a method for a node to generate and send a single instance Heartbeat message (e.g., block 520, FIG. 5) in accordance with one embodiment of the present invention. The single instance Heartbeat message indicates that the associated master application instance is functioning properly. The method begins, in block 602, by determining whether an application instance has just been promoted to the Master State (e.g., in block 518, FIG. 5).

Figure 8:
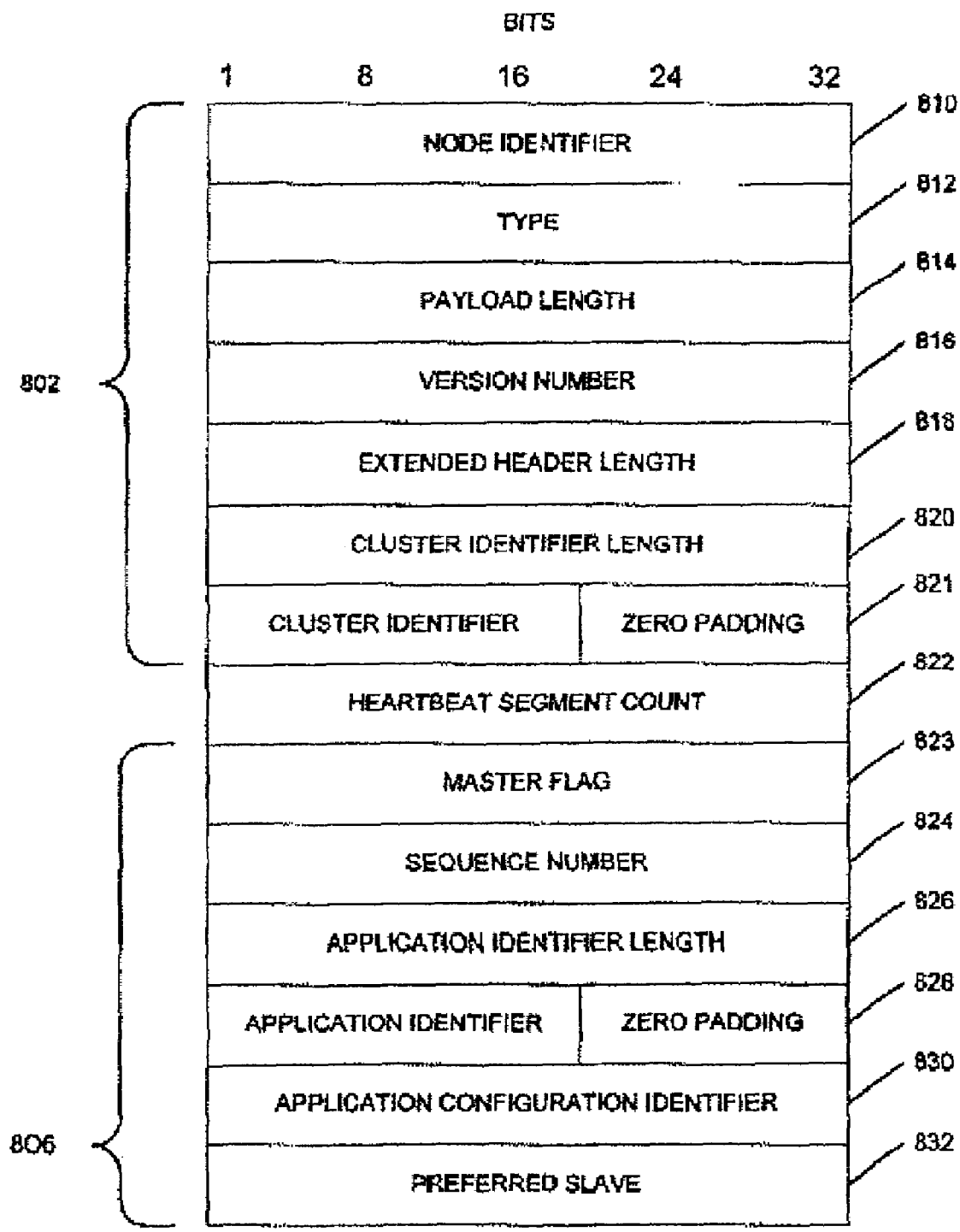
FIG. 8 illustrates a diagram of a multiple instance Heartbeat message format in accordance with one embodiment of the present invention.

If not, the method ends. If so, then a single instance Heartbeat message is generated, in block 604. A single instance Heartbeat message includes several items of information. Referring also to FIG. 8, which will be described in more detail later, a single instance Heartbeat message includes a node identifier (field 810), a message type (field 812), and an application identifier (field 828). The node identifier (field 810) specifies the identity of the node that is sending the Heartbeat message. The message type (field 812) indicates that the message is a Heartbeat message. Finally, the application identifier (field 828) specifies the identity of the application instance that was just promoted to the Master State. In one embodiment, the Heartbeat message includes other fields, as well, but those fields will be described in more detail later.

Referring back to FIG. 6, after the single instance Heartbeat message has been generated, the node sends the Heartbeat message out over one or more networks, in block 604, and the method ends. In an alternate embodiment, the node could wait until a later time before it sends out the message.

Figure 7:
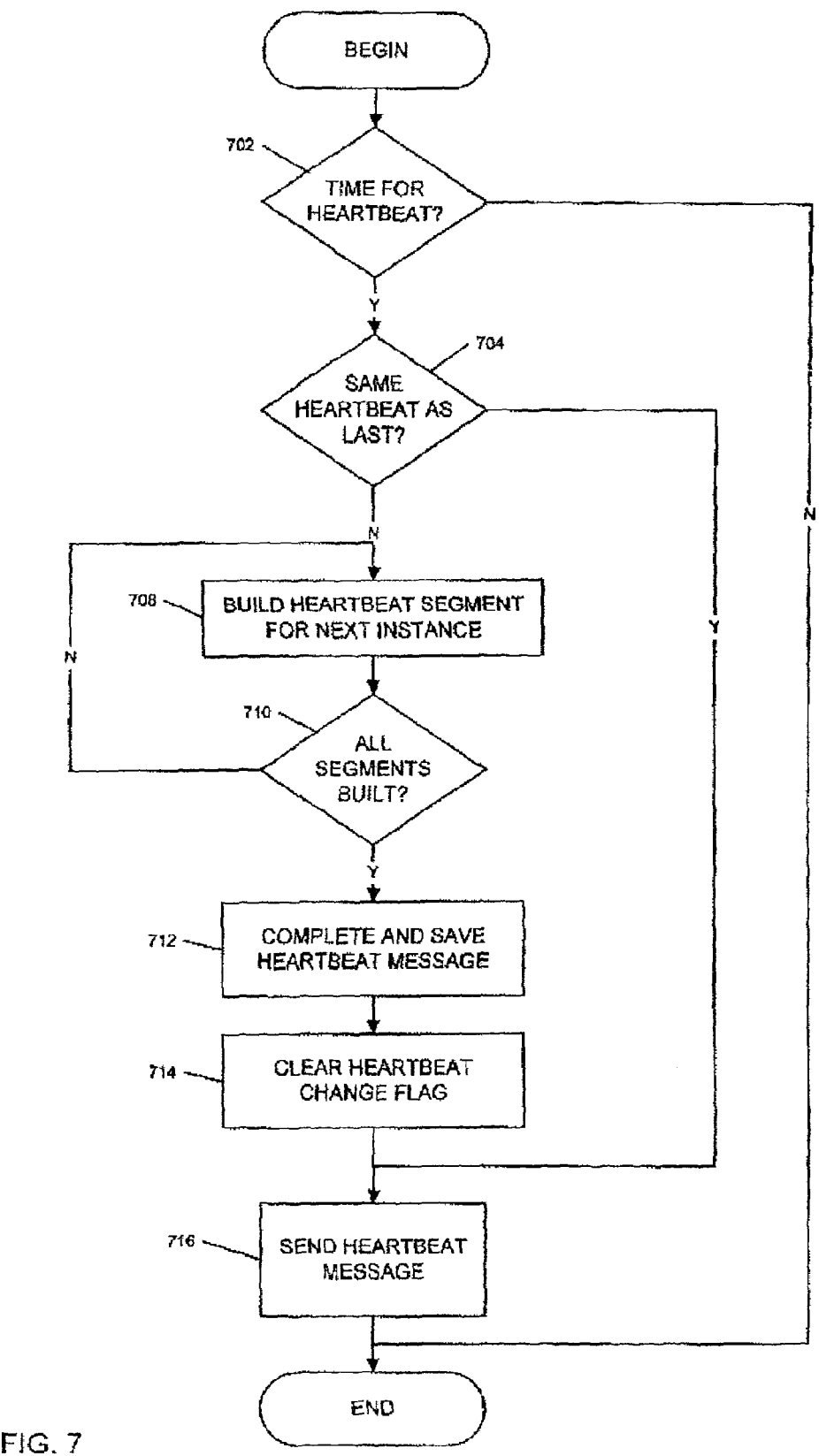
FIG. 7 illustrates a flowchart of a method for a node to generate and send a multiple instance Heartbeat message in accordance with one embodiment of the present invention.

FIG. 7 illustrates a flowchart of a method for a node to generate and send a multiple instance Heartbeat message in accordance with one embodiment of the present invention. The method is performed, in one embodiment, during execution of block 526 of FIG. 5, although it could be performed at other times, as well.

A multiple instance Heartbeat message includes a "heartbeat segment" for at least one, and potentially many, master and/or slave application instances. Each heartbeat segment included in the message indicates that the associated master or slave application instance is functioning properly.

The method begins, in block 702, by determining whether it is time to generate a multiple instance Heartbeat message. This is indicated, in one embodiment, when at least one of the application instances evaluated in blocks 516–524 (FIG. 5) was a master or slave application instance that had timed out. During execution of those blocks, if an evaluated application instance was a master or slave, the method would have set a flag or other indicator, which indicates that a Heartbeat message needs to be generated, which includes a segment for the application instance. In addition or alternatively, during execution of blocks 516–524 (FIG. 5), the method could have set aside all information necessary to build a heartbeat segment for each master or slave application instance. In still another alternate embodiment, the entries within the application instance state table could be evaluated again, during execution of block 702, to determine whether any master and/or slave application instances had timed out. If it is determined, in block 702, that it is not time to generate a multiple instance Heartbeat message, then the method ends.

If it is determined that it is time to generate a multiple instance Heartbeat message, then a determination is made, in block 704, whether the Heartbeat message is identical to the last multiple instance Heartbeat message sent out by the node (e.g., during the last time the main master-slave task was executed). In one embodiment, each transmitted Heartbeat message is saved (e.g., in block 712, described later) until it becomes necessary to generate a new Heartbeat message.

The determination of block 704 is made, in one embodiment, by checking a "heartbeat change flag." The flag is cleared (e.g., in block 714, described later) each time a new multiple instance Heartbeat is sent out. The flag is set when, for example, an application instance enters or leaves the Master State or the Slave State (e.g., in block 518, FIG. 5), or when one or more application instances fail as a master or are incapable of being a slave. In such cases, a new heartbeat segment would be needed for the application instance, and thus the next Heartbeat message would be different.

In other embodiments, other items of information could be checked to determine whether the Heartbeat message is the same as the previous message. For example, in one embodiment, the method could count the number of heartbeat segments needed for the new Heartbeat message. If this number matches the number of segments that were included in the last message (i.e., the "previous segment number"), and the application IDs (e.g., fields 404, FIG. 4) for the master and/or slave application instances match the previously sent application IDs, it could indicate that the Heartbeat message is the same. In another embodiment, if something happened (e.g., a state transition or application instance failure) that would warrant a new Heartbeat message, the previous segment number could be set to zero or some other improbable value. Then when the number of new heartbeat segments is compared with the previous segment number, a need for a new message would be indicated.

If block 704 indicates that the new Heartbeat message is identical to the previously sent Heartbeat message, then the previously sent Heartbeat message is retrieved and sent, in block 706, and the method ends. If block 704 indicates that the new Heartbeat message is not identical to the previously sent Heartbeat message, then a new Heartbeat message is generated in blocks 708–714.

In block 708, a heartbeat segment is built for the first (or next) master or slave application instance having an expired state timer. Referring again to FIG. 8, and similar to the single instance Heartbeat message, each multiple instance Heartbeat message has a node identifier 810, a message type 812, and one or more application identifiers 828. The node identifier 810 and the message type 812 are included in a Heartbeat message header 802. The application identifier 828 is included in a heartbeat segment 806. In one embodiment, the application identifier 818 is obtained from the application instance state table (e.g., table 400, FIG. 4), although it could be obtained elsewhere.

Each Heartbeat message includes a single header 802 and one or more heartbeat segments 806. Accordingly, for a single instance Heartbeat message, only a single heartbeat segment 806 is included. For a multiple instance Heartbeat message, a heartbeat segment 806 is included for each master and/or slave application instance whose state timer expired. This means that a multiple instance Heartbeat message could include from one to many heartbeat segments 806. A more detailed description of FIG. 8 is given later.

In one embodiment, if the Heartbeat message is at all different from the previously sent Heartbeat message, then all heartbeat segments are rebuilt, regardless of whether each individual segment would be different. In another embodiment, only those heartbeat segments that are different are rebuilt.

After building the heartbeat segment for the next master or slave application instance, a determination is made, in block 710, whether all segments have been built. For example, all segments would be considered built if a segment had been built for each timed out master and/or slave application instance in the application instance state table (e.g., table 400, FIG. 4). If all segments have not been built, then the procedure iterates as shown.

If all segments have been built, then the Heartbeat message is completed and saved, in block 712. Completing the Heartbeat message includes concatenating the header (e.g., header 802, FIG. 8) with the heartbeat segments (e.g., segment 806, FIG. 8), and adding other information or addressing layers, as needed. In another embodiment, the header could be built at an earlier time.

In block 714, the heartbeat change flag, which was evaluated in block 704, is then cleared, in one embodiment. As described previously, the heartbeat change flag can be used to determine whether something has occurred (e.g., a state transition or application instance failure) that would somehow change the next Heartbeat message to be sent out. The Heartbeat message is then sent out over one or more networks, in block 716. In an alternate embodiment, the node could wait until a later time before it sends out the message. After sending out the Heartbeat message, the method ends.

FIG. 8 illustrates a diagram of a multiple instance Heartbeat message format in accordance with one embodiment of the present invention. In one embodiment, each message field 810–832 is in a long-word aligned, 32-bit format, rather than an 8-bit byte format, as was used for the TSP protocol of the prior art. Accordingly, the message format of this embodiment is better suited for modern computers, which work more efficiently on long-word aligned messages. The format makes message creation and processing easier, and avoids masking and shifts, to a large extent. In other embodiments, the message fields could have more or fewer bits, as is appropriate for the network and computer systems upon which the present invention is implemented.

The Heartbeat message format includes a header 802 and a payload. In one embodiment, the payload consists of one or more heartbeat segments 806. For a single instance Heartbeat message, only a single heartbeat segment 806 exists in the message. For a multiple instance Heartbeat message, anywhere from one to many heartbeat segments 806 are concatenated together within the message. Because the number of heartbeat segments 806 can vary from message to message, a heartbeat segment count field 822 is also present in the Heartbeat message. Basically, the segment count 822 indicates how many heartbeat segments 806 are present in the Heartbeat message. The segment count 822 could be, but is not necessarily, part of the header 802.

The header 802 includes several fields: a node identifier 810; message type 812; payload length 814; version number 816; extended header length 818; cluster identifier length 820; and cluster identifier 821. The node identifier field 810 includes a value, which uniquely identifies the node from which the message was sent.

The message type field 812 includes a value, which indicates what type of command or response the message is. In the context of the present invention, the message type indicates a Heartbeat message. In one embodiment, no distinction is made whether the message is a single instance or a multiple instance Heartbeat message. In another embodiment, different message types could be used for a single instance and multiple instance Heartbeat message. When the same message format is used for other types of messages, the message type could indicate, for example, that the message is a MasterAck message, an Election message, a Resignation message, or any other type of message that was described in conjunction with FIG. 2. In other embodiments, additional or different messages could be included in the protocol, besides the messages described in conjunction with FIG. 2.

The payload length field 814 includes a value, which indicates the total size of the message's payload. This allows the node to perform buffer size comparisons against the size of the message payload to be processed. In some cases, elements of the payload may be zero-padded. In one embodiment, the length of the zero padding is included in the payload length. In another embodiment, the payload length field 814 could be used as a message length field and could include a value indicating the length of the entire message being processed, rather than just the payload length. As described above, the heartbeat message has a format that allows multiple heartbeat segments to be included within the heartbeat message, and the payload length field 814 enables the number of segments to be determined. In other embodiments, the number of heartbeat segments could be indicated in some other way (e.g., by including an integer value that indicates the number of segments).

The version number field 816 includes a value, which indicates the protocol version number of the message. For example, the initial version of the protocol could have a version number of "1." Future updated versions, which could include changes to message contents or format, would have higher (or different) version numbers. The version number enables the receiving node to know the protocol version on which the node should base its processing of the message.

Similarly, the extended header length field 818 includes a value, which indicates how much longer the header 802 is for the new protocol version, if at all longer. For the initial version, the value would likely be "0." By including the version number field 816 and the extended header length field 818, nodes that cannot process all the elements of the current version of the protocol are still able to process those fields that are known. Accordingly, the header format enables both backward and forward compatibility.

In one embodiment, the header 802 also includes two fields 820, 821, which help to identify a "cluster" of nodes for which the message is pertinent. A cluster is a named, virtual group of nodes, interconnected by one or more networks. The nodes in a cluster send each other Heartbeat messages and act as masters and slaves for each other for various application instances. The concept of clusters enables grouping of application instances and/or application types. In one embodiment, each node is a member of only one cluster. In other embodiments, a node could be a member of more than one cluster.

The cluster for which the message is pertinent is identified in a cluster identifier field 821 of header 802. In one embodiment, the cluster identifier is an array of unsigned characters that is padded out to the nearest long word address. Therefore, the cluster identifier field 821 may contain one or more bits of padding (e.g., zero padding). In order to identify the length of the cluster identifier, the header 802 also includes a cluster identifier length field 820, in one embodiment. The cluster identifier length specifies the true length of the cluster identifier, minus any padding.

As described previously, each message also includes a payload that consists of one or more heartbeat segments 806. In one embodiment, the heartbeat segment 806 includes several fields: a master flag 823; a sequence number 824; application identifier length 826; application identifier 828; an application configuration identifier field 830 and a preferred slave field 832. In other embodiments, these fields could be in different orders, and/or some fields could be excluded, and/or other fields could be included in the message.

The master flag 823 includes a value, which indicates whether the node that created the message (as identified by node ID 810) is the master of the application instance associated with the heartbeat segment. In one embodiment, the flag 823 is set if the node is the master, and is cleared if the node is a slave.

As indicated in the description of FIG. 2, it is not imperative that messages receive responses, in accordance with one embodiment. However, certain message exchanges do hope for a request-response sequence. For example, when a MasterReq message is sent out, it is expected that a MasterAck message may be received in response. Therefore, in one embodiment, a sequence number is included with some or all messages. In one embodiment, no responses are expected for Heartbeat messages. Therefore, a sequence number may or may not be included in the message. Regardless, the sequence number is described in detail below.

The sequence number field 824 includes a sequence number, which is incremented for every request message that a master creates and sends for a particular application instance. In one embodiment, slaves do not maintain a sequence number to identify requests that it sends, because slaves rarely (or never) send such requests. In another embodiment, each slave does maintain a sequence number for requests that it sends. In still another embodiment, sequence numbers are not needed, and therefore are not used by masters or slaves at all.

A response that a slave makes to the master's request message uses the same sequence number that was in the master's request message. Therefore, the sequence number enables the master to associate a slave's response to the associated, previously-sent request.

In one embodiment, each slave keeps track of a master's sequence number for each application instance. This enables a slave to avoid reacting to or responding to previously received messages. In other words, the sequence number enables the slave to identify duplicate messages, such as duplicate messages that a master sends out on multiple networks.

In one embodiment, when a slave is promoted to a master for an application instance, the slave uses an incremented continuation of the sequence number used by the previous master. By using a continuation of the sequence number, other slaves will not reject the new master's messages as having been previously sent or unrecognized.

The application instance for which the message is pertinent is identified in an application identifier field 828. In one embodiment, the application identifier includes the application type and the particular application instance ID to which the message pertains (i.e., the destination application instance). The application identifier is an array of unsigned characters that is padded out to the nearest long word address. Therefore, the application identifier field 828 may contain one or more bits of padding (e.g., zero padding). In order to identify the length of the application identifier, the heartbeat segment 806 also includes an application identifier length field 826, in one embodiment. The application identifier length specifies the true length of the application identifier, minus any padding.

The application configuration identifier field 830, which forms a portion of a heartbeat segment 806, indicates an identifier of the current configuration of the database, if any, that a master is using for a particular application instance. This enables slaves to determine whether the configuration information that they are using is correct or is outdated. In the event that the configuration information that a slave is using is outdated, the slave node can request the correct configuration information from the master or elsewhere. The process of evaluating and requesting configuration information is described in detail in conjunction with FIGS. 10 and 12.

Finally, the heartbeat segment 806 includes a preferred slave field 832. The preferred slave field 832 includes a value that identifies which of the potential slaves is preferred as the new master, in the event that the current master resigns or is unable to continue serving as the master for an application instance.

Although the description of FIG. 8, above, specifies a number of different message fields 810–832 arranged in a certain order, more, fewer or different message fields could be included in other embodiments, and these message fields could be arranged in different orders than the order shown in FIG. 8.

As described previously, the main master-slave task can execute periodically (e.g., as described in conjunction with FIG. 5), or the task can execute when an event occurs (e.g., a monitor, resignation or message event). A message event can be, for example, a receipt of a message from a remote node that warrants a state transition in the local node. For example, referring also to FIG. 2, when an application instance is in the Master State 218 and receives a Conflict message, the main task would then be called upon to send out a Resolve message and enter the Conflict State 222.

Figure 9:
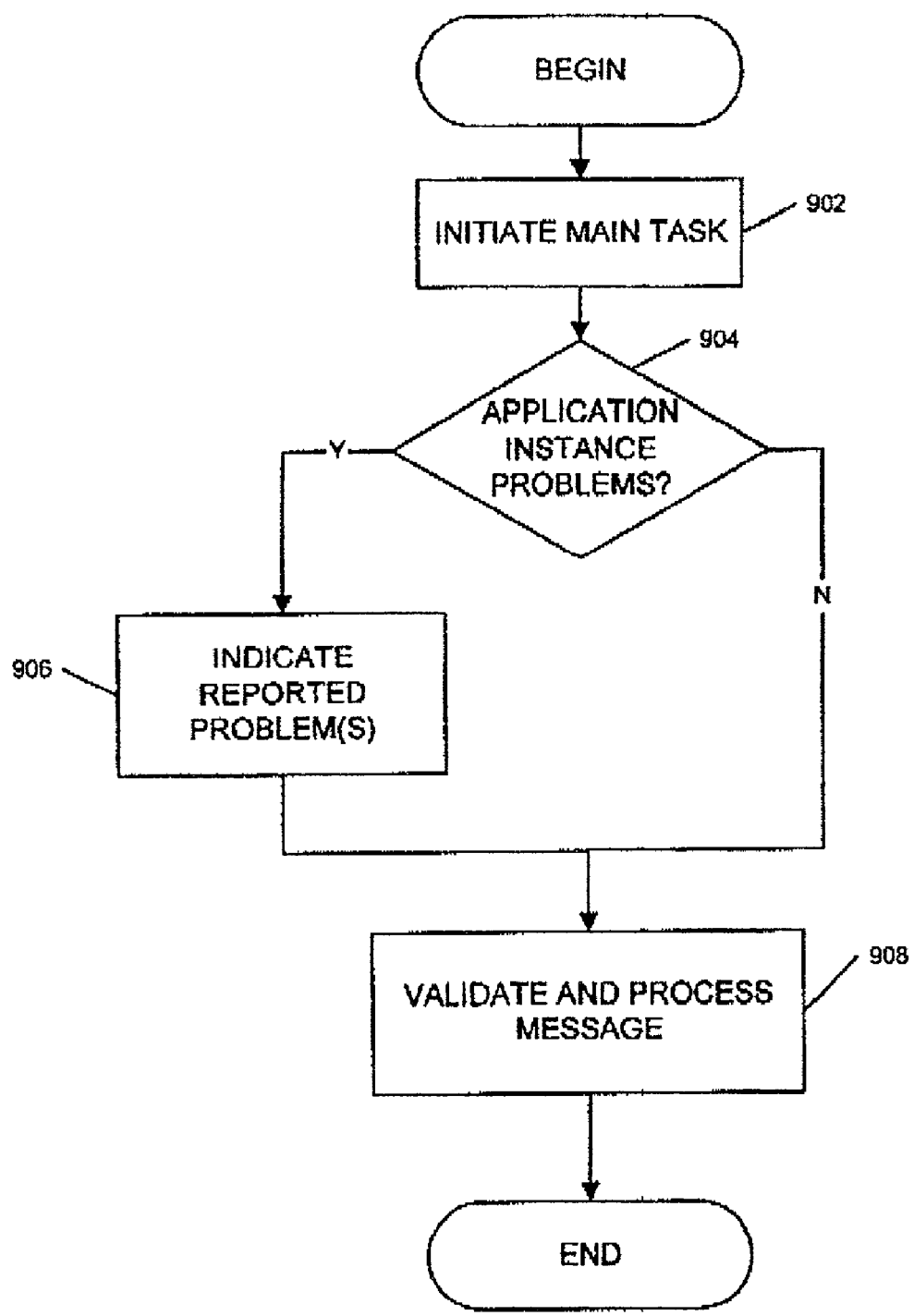
FIG. 9 illustrates a flowchart of a method for a main master-slave task to execute when an event occurs in accordance with one embodiment of the present invention.

FIG. 9 illustrates a flowchart of a method for a main master-slave task to execute when an event occurs in accordance with one embodiment of the present invention. An "event" could be, for example, any periodic or intermittent event that warrants execution of the main master-slave task. For example, an event could be the receipt of a particular message from another node or the receipt of information from a monitor task regarding the operational status of a particular application instance. Typically, the event is something that occurs, which may affect the state diagram of one or more application instances that the main task is executing or monitoring.

The method begins, in block 902, when the main task is initiated after an event occurs. The event could be, for example, receipt of a message from another node that is operating in the master or slave state for an application instance. These types of messages are referred to herein as "network" or "inter-node" messages. Alternatively, an event could be receipt of a second message type from the monitor task running on the node, as will be described in more detail in conjunction with FIG. 11. These second message types are referred to herein as "internal" or "intra-node" messages.

A determination is made, in block 904, whether the event indicates that there is a problem or potential problem with one or more local or remote application instances. This determination could be made, for example, if the main task received an internal message from the monitor task, which indicates an application instance, application or node problem. For example, the monitor task could have determined that a master application instance has failed, or that the node will soon fail. The monitor task would have then sent an internal message to the main master-slave task, reporting the problem. As another example, the node may have received a Heartbeat message from a remote node, indicating that a master application instance at the remote node has failed. Numerous other network messages also could be received (e.g., MasterAck, Election, Quit, Resolve, etc.), which do not necessarily indicate a problem with an application instance.

If a problem exists with one or more application instances, the reported problem or problems are indicated, in block 906. In one embodiment, a problem with a specific application instance is indicated by the main task modifying the monitor result flag (e.g., field 410, FIG. 4), within the application instance state table (400, FIG. 4) for the appropriate application instance. The next time the main master-slave task is called upon to generate a Heartbeat message, the task will know to exclude the application instance from the message.

After indicating the reported problem(s), or if an application instance problem has not been identified in block 904, the main task then validates and processes the internal or external message, in block 908. Processing the message can include, for example, sending a message, performing a state transition, or doing nothing, as required. The particular action (or inaction) performed by the main task depends on the state, as was described in detail in conjunction with FIG. 2. If a state transition was performed, the main task then initializes the corresponding state timer. The method then ends.

For example, if the node received a Heartbeat message from a remote node, the node would validate and process the message, and reset any relevant timers (e.g., Slave State timers). Processing of a Heartbeat message from a remote node is described in detail in conjunction with FIG. 10. As another example, if a local master application instance has failed, which constitutes a resignation event, the main task could send out a Resignation message, and transition from the Master State (218, FIG. 2) to the Resignation State (220, FIG. 2). Numerous other state transitions could occur and messages could be sent, depending on the particular state of an application instance and the type of event that occurred, as indicated and described in detail in conjunction with FIG. 2.

FIG. 9 illustrates that the main task is initiated when a message event occurs. In another embodiment, rather than invoking the main task for a message event, the node could queue up received messages, and the main task could respond to the queued messages the next time the task is periodically invoked (e.g., as described in conjunction with FIG. 5). In still another embodiment, the main task could be run continuously. Accordingly, the main task could alter the various state timers based on a system clock, and the task could respond to messages as they are received.

Figure 10:
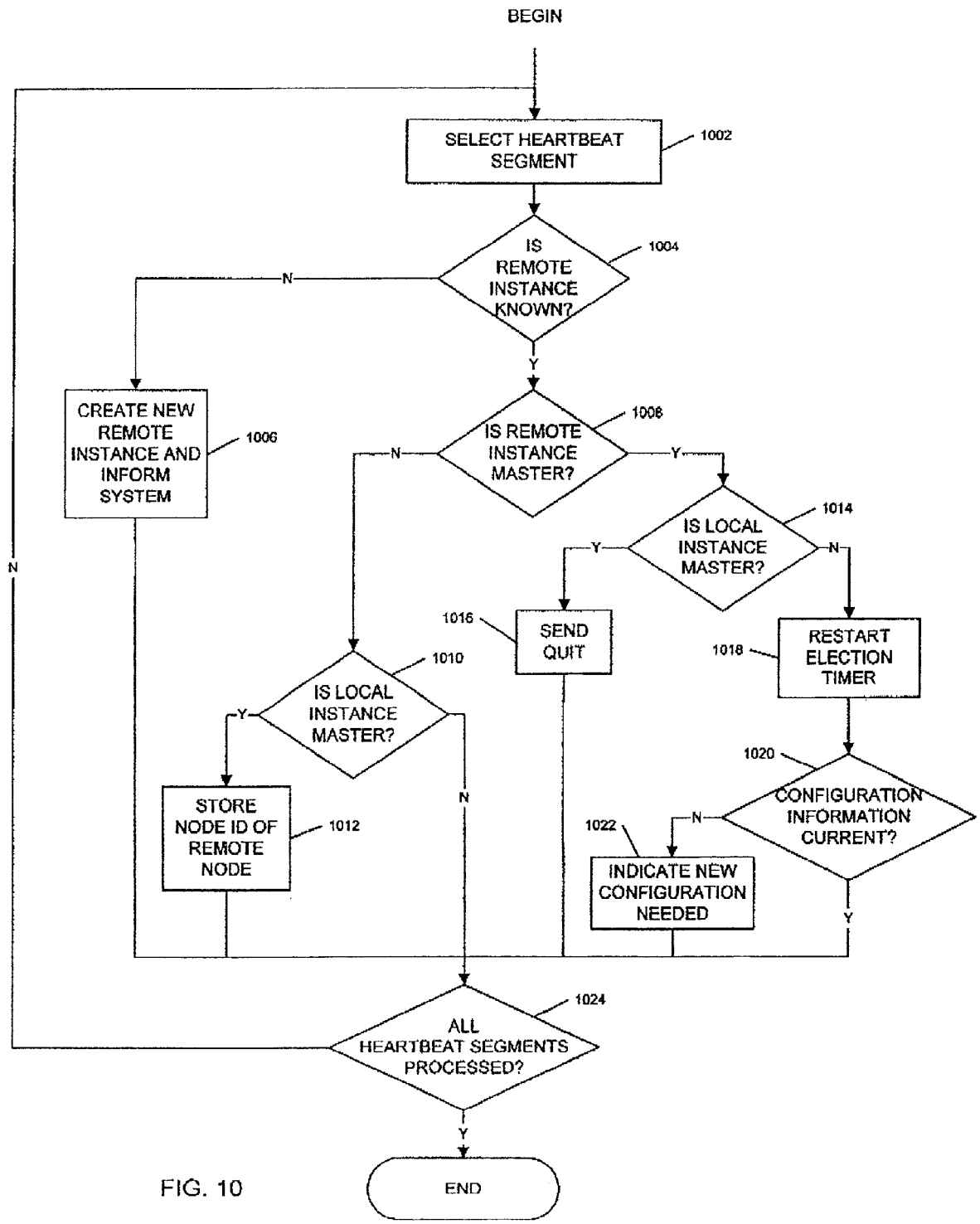
FIG. 10 illustrates a flowchart of a method for a node to receive and process a heartbeat message in accordance with one embodiment of the present invention.

FIG. 10 illustrates a flowchart of a method for a node to receive and process a Heartbeat message in accordance with one embodiment of the present invention. In one embodiment, receiving a Heartbeat message from a remote node is considered a message event, which causes the main master-slave task to be invoked as described in conjunction with FIG.

9. Further, in one embodiment, the received Heartbeat message is processed in the context of block 908 (FIG. 9). In another embodiment, received Heartbeat messages could be stored and processed at a later time (e.g., upon the next periodic execution of the main task).

The method begins after a Heartbeat message has been received from a remote node. After the message has been validated, a heartbeat segment is selected for processing, in block 1002. The message is considered valid, for example, if the header information indicates that the message is a Heartbeat message from a remote node.

As described previously, a heartbeat segment (e.g., segment 806, FIG. 8) is a segment of the message that pertains to a particular application instance. In one embodiment, the first heartbeat segment following the message's header is initially selected for processing. During later iterations of the method, if any are necessary, the next sequential heartbeat segment is selected for processing, and so on. In another embodiment, the heartbeat segments could be selected in a different order.

In block 1004, a determination is made whether the remote application instance identified in the heartbeat segment (e.g., by the application identifier 828, FIG. 8) is known to the local node. In one embodiment, the remote application instance would be known if an entry with the same application identifier (e.g., field 404, FIG. 4) exists in the application instance state table (e.g., table 400, FIG. 4) stored at the local node.

If the remote application instance is not known, then the local node creates a new remote instance, in block 1006. In one embodiment, this is done by adding a new table entry to the application instance state table, where the new entry includes the application identifier (e.g., in field 404, FIG. 4) of the remote instance, and where the state (e.g., field 406, FIG. 4) of the instance is set to "slave." In one embodiment, the state timer value (e.g., field 408, FIG. 4) is synchronized with the other slave state timer values. In another embodiment, the state timer can be initialized to some other value. In addition, the new configuration flag (e.g., field 414, FIG. 4) is set to indicate that the node should obtain configuration information, if any, for the new application instance. In one embodiment, the system (e.g., the operating system) is notified that a new application instance exists, which gives the system the opportunity to allocate memory and/or other resources, if necessary.

If, as determined in block 1004, the remote instance is known, then a determination is made, in block 1008, whether the remote instance is a master. In one embodiment, this determination is made by checking a master flag (e.g., flag 823, FIG. 8) within the heartbeat segment 806. If the flag is set, then the remote instance is presumed to be the master for the application instance, in one embodiment. If the flag is cleared, then the remote instance is presumed not to be the master.

If the remote instance is not master, then a determination is made, in block 1010, whether the local instance is master. This determination is made, in one embodiment, by evaluating the entry, which corresponds to the application identifier in the heartbeat segment (e.g., entry 828, FIG. 8), with the corresponding entry in the application instance state table (e.g., table 400, FIG. 4). If the current state field (e.g., field 406, FIG. 4) indicates that the local instance is master, then the node identifier (e.g., node identifier 810, FIG. 10) corresponding to the received Heartbeat message is stored, in block 1012, in one embodiment. In one embodiment, the stored node ID indicates which slave node was most recently heard from. This enables the local node to resign, if necessary, to the slave from which the local node last received a Heartbeat message, or to one of the most recently heard from slaves. In another embodiment, the node identifier is not stored.

If the remote instance is master, as determined in block 1008, then a determination is made, in block 1014, whether the local node also is a master. Again, this determination is made, in one embodiment, by evaluating the entry, which corresponds to the application identifier in the heartbeat segment (e.g., entry 828, FIG. 8), with the corresponding entry in the application instance state table (e.g., table 400, FIG. 4). If the current state field (e.g., field 406, FIG. 4) identifies the local instance as master, this indicates that more than one node is attempting to act as master. Having multiple masters is an undesirable condition, so in accordance with the state diagram illustrated in FIG. 2, when a Heartbeat is received from another master, the local node sends a Quit message, in block 1016, to the remote node, and the local node maintains the application in the Master State (e.g., state 218, FIG. 2).

If the local instance is not master, as determined in block 1014, it indicates that the local instance is instead a slave. As described previously, when a slave receives a Heartbeat message from the master, the application instance's election timer is restarted, in block 1018. In addition, in one embodiment, a determination is made, in block 1020, whether the configuration information for the application instance is considered current. This determination is made, in one embodiment, by comparing the application configuration identifier (e.g., field 830, FIG. 8) corresponding to the remote application instance with a stored configuration identifier for the local application instance (e.g., in field 416, FIG. 4). If the comparison indicates that the local node does not have the newest configuration information for the application instance, then an indication is made, in block 1022, that a new configuration is needed. In one embodiment, this is done by setting a new configuration flag (e.g., flag 414, FIG. 4) and changing the configuration ID (e.g., field 416, FIG. 4) to the new configuration identifier, which was included in the heartbeat segment.

After the heartbeat segment has been evaluated, in blocks 1002–1022, a determination is made, in block 1024, whether all heartbeat segments (e.g., all segments 806, FIG. 8) within the received Heartbeat message have been evaluated. In one embodiment, this is done by comparing the number of heartbeat segments evaluated with the heartbeat segment count 822 (FIG. 8) within the Heartbeat message. If all heartbeat segments have not been evaluated, then the next heartbeat segment is selected for evaluation, in block 1002, and the method iterates as shown. If all heartbeat segments have been evaluated, then the method ends. As described previously, a single instance Heartbeat message would include only one heartbeat segment. For such a message, only one iteration of the method would be performed. In contrast, a multiple instance Heartbeat message could include from one to many heartbeat segments, so from one to many iterations of blocks 1002–1022 would be performed.

As described previously, in one embodiment, a separate "monitor task," exists to monitor, for correct operation, those application instances that are in the master state on the node. In addition, the monitor task can monitor the operation of the node itself and/or various functions or components associated with the node (e.g., the CPU, memory, operating system, temperature or radiation sensor, power supply, etc.). For ease of description, the term "application instance" is meant to refer to any entity that is being monitored by the monitor task, including but not limited to, applications, application instances, the node, and/or various software or hardware components associated with the node.

Each application instance that wants to be monitored for correct operation "registers" itself by sending a message to the main task. This message identifies the application instance, and also includes the criteria that the monitor task should use to determine whether or not the application instance is operating correctly. The operating system and/or the node itself can also ask the monitor task to monitor particular functions for correct operation, in one embodiment. For example, the node may ask the monitor task to periodically check the value of a sensor that measures the temperature of the node, a component, or the atmosphere. As another example, the operating system may ask the monitor task to periodically check certain performance metrics, such as operating system throughput, for example.

Figure 11:
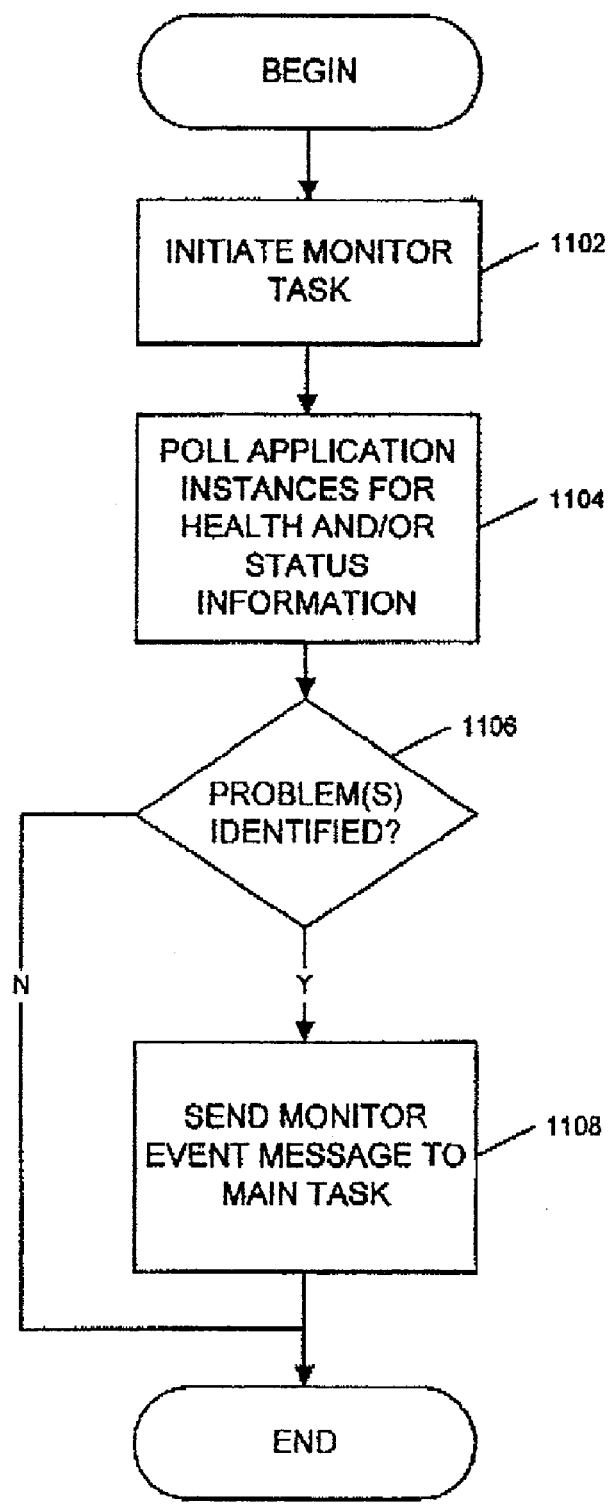
FIG. 11 illustrates a flowchart of a method for a monitor task to execute in accordance with one embodiment of the present invention.

FIG. 11 illustrates a flowchart of a method for a monitor task to monitor application instance operations in accordance with one embodiment of the present invention. In one embodiment, the monitor task is a separate task from the main master-slave task, and both tasks are separately invoked. In another embodiment, some or all of the functionality of the monitor task is incorporated into the main task.

The method begins, in block 1102, after the monitor task has been periodically initiated. In one embodiment, the task is initiated upon expiration of a system timer, which indicates that it is time to run the monitor task. This system timer is re-initialized after it expires. The system timer could be the same watchdog timer as is used by the main task, or it could be a separate timer. In another embodiment, the monitor task is a periodically invoked, for example, when some interrupt occurs or when a message is received.

In one embodiment, in block 1104, the monitor task polls the application instances identified in the application instance state table (e.g., table 400, FIG. 4), and determines the health and/or operational status of those instances that the monitor task has been asked to monitor. In one embodiment, the monitor task only monitors those application instances that are in the Master or Slave States (e.g., states 218, 212, FIG. 2). In other embodiments, the monitor task can monitor application instances that are in other states as well.

In addition to polling application instances identified in the state table, in one embodiment, the monitor task determines the operational status of any other monitorable functions or components, which might not have been included in the application instance state table. For example, the node could have registered with the monitor task to check the charge of the node's battery. If the battery charge is too low, it could represent an imminent failure of all application instances in the Master State.

In block 1106, the monitor task determines whether a problem has been identified in block 1104 or otherwise, which indicates that the health and/or operational status of one or more application instances are degraded. This determination can be made, for example, if the application instance itself reported a problem, or if the monitor task identified a problem based on information (or a lack thereof) sent to the monitor task from the application instance. Alternatively, the monitor task could obtain information directly (e.g., by making measurements), or could invoke one or more other routines to obtain information indicating the health and/or operational status of the application instances.

If a problem has been identified with one or more application instances, then in block 1108, the monitor task sends one or more intra-node (i.e., internal) monitor event messages to the main task, which identify the application instance(s) and/or other monitorable functions or components. The message also may give other information, such as an indication of the severity of the operational degradation, or an amount of time before the application instance will not be able to function as a master, for example. The monitor task may then cause one or more application instances to resign as masters, as described previously in conjunction with Resignation State 220, FIG. 2. Should an application, application instance, operating system function, or the node function simply fail before the monitor task can alert the main task, or before the main task initiates or completes a resignation procedure, the node will not send out Heartbeat messages that identify the affected application instances, and one or more of the slave nodes will hold an election to attempt to take over the failed application instances.

If the operation is not degraded, as indicated in block 1106, or after sending a message to the main task, in block 1108, then the method then ends. The monitor task is then later initiated again upon expiration of the timer, or upon the occurrence of some interrupt or message event.

As described previously, a configuration update task also is run in order to keep the configuration information of each node's application instances up to date. This configuration information could include, for example, databases, settings or any other fixed or variable values, which affect the operation of an application instance or the node. Typically, a master application instance has access to and uses the most current configuration, which may change from time to time. Although a slave may not be running at the same time as the master, it may be desirable for a slave application instance to maintain the most current configuration information at the slave node, in case the slave needs to take over as master. In one embodiment, even when a master is operating properly, slaves are able to regularly determine whether they have the most current configuration information, and if they do not have the most current information, a slave is able to invoke the node to obtain it. In another embodiment, the determination of whether a slave has the most current configuration information could be made after a master resigns or when an election is called.

Figure 12:
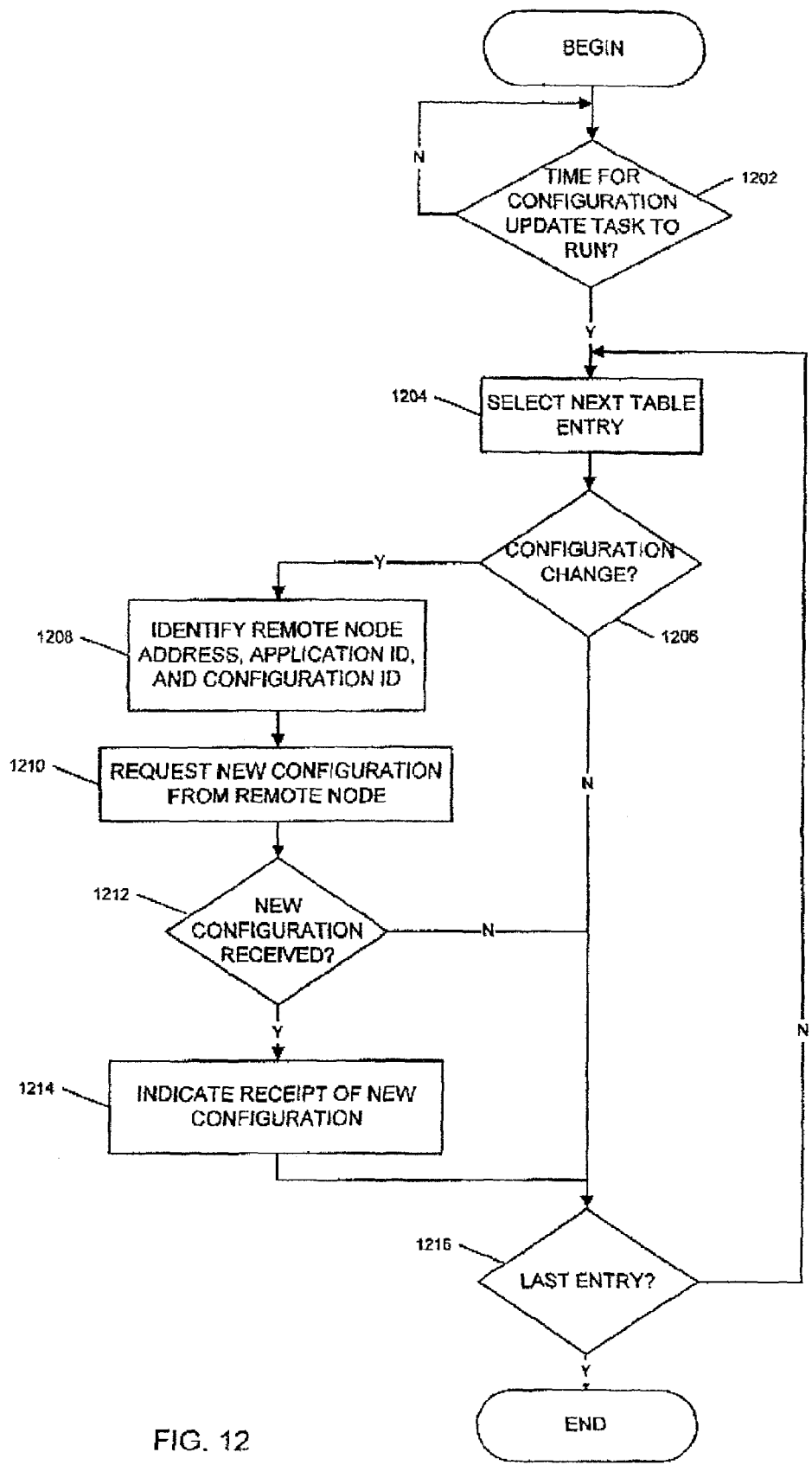
FIG. 12 illustrates a flowchart of a method for a new configuration task to execute in accordance with one embodiment of the present invention.

FIG. 12 illustrates a flowchart of a method for a new configuration task to execute in accordance with one embodiment of the present invention. In one embodiment, the method begins, in block 1202, when a determination is made that it is time for the configuration update task to run. The new configuration task could be run upon the occurrence of some event, in one embodiment. For example, a node could receive a message indicating that a new configuration is available, and that message could invoke execution of the new configuration task. Alternatively, the node could send an internal message indicating that a configuration is not current or has been corrupted, which also could invoke the configuration task.

In other embodiments, the new configuration task could be run periodically (e.g., upon expiration of a timer) or as part of the main master-slave task. In the latter case, it would be time for the new configuration task to run when it is time for the main master-slave task to run. In such an embodiment, some of the blocks shown in FIG. 12 would not be necessary, as they would already be performed as part of the main master-slave task. In particular, blocks 1202, 1204, and 1216 would not need to be performed. Instead, blocks 1206–1214, which are described in more detail below, would be performed as part of the inner loop of FIG. 5, at some time before block 524 (FIG. 5).

If it is time for the configuration update task to run, then the next entry in the application instance state table (e.g., table 400, FIG. 4) is selected, in block 1204. In one embodiment, entries are evaluated in a top-down, sequential order, although the entries could be evaluated in a different order as well.

A determination is then made, in block 1206, whether a configuration change has occurred. A configuration change would be a change of the configuration information that is used by the master, and which should be used by the slaves, for a particular application instance. In one embodiment, a configuration change is indicated by evaluating the new configuration flag 414 (FIG. 4) corresponding to the selected entry. In other embodiments, a configuration change could be indicated by some other stored indicator or by a received message.

If a configuration change is indicated, then information is identified, in block 1208, which enables the local node (e.g., the slave) to obtain the updated configuration information from a remote node (e.g., the master or some other node). In one embodiment, this information includes the remote node address (e.g., the address of the master), the application identifier (e.g., application ID 404, FIG. 4), and the configuration identifier (e.g., configuration ID 416, FIG. 4) for the new configuration.

In block 1210, a request is then made to obtain the new configuration from the remote node. In one embodiment, the new configuration task requests the new configuration by making a function call to the local node's operating system, where the function call includes some or all of the information identified in block 1208. In other embodiments, the new configuration can be requested by sending a message over the network to the remote node.

Eventually, the new configuration information should be received by the local node. If, as determined in block 1212, the new configuration information is received within any applicable time limits, then the new configuration task indicates receipt of the new configuration information in block 1214. In one embodiment, receipt of the new configuration information is indicated by clearing the new configuration flag (e.g., flag 414, FIG. 4).

If no configuration change is indicated for the selected entry in block 1206, or if the new configuration is not received within the applicable time limit in block 1212, or after indicating receipt of the new configuration information in block 1214, a determination is made whether the selected entry is the last entry in the application instance state table (e.g., table 400, FIG. 4), in block 1216. If not, the procedure iterates as shown. If so, then the procedure ends.

Figure 13:
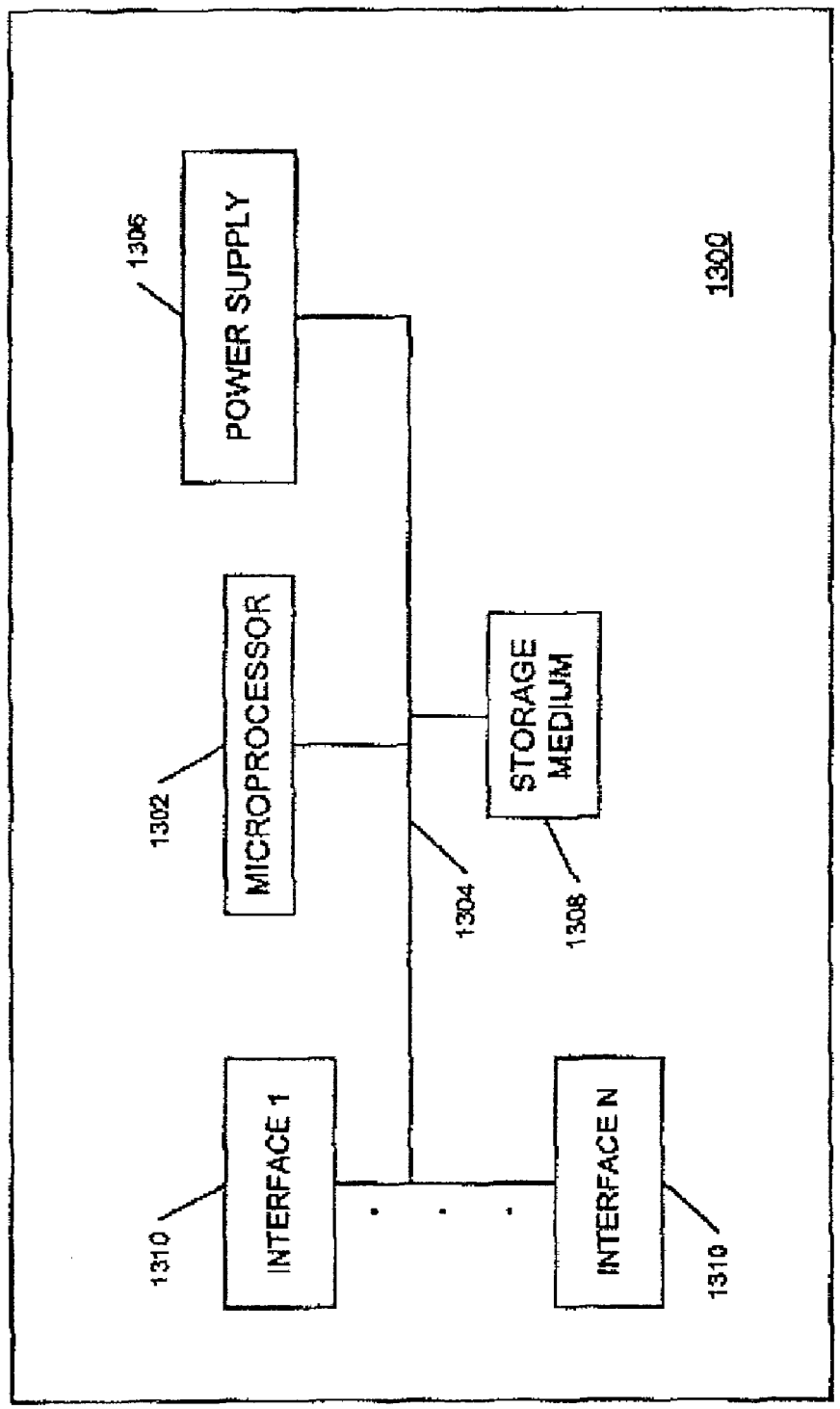
FIG. 13 illustrates a general-purpose computer within which functions of the various embodiments can be practiced in accordance with one embodiment of the present invention.

The functions of the various embodiments can be practiced on a general- or special purpose computer system. FIG. 13 illustrates a general-purpose computer system 1300 (e.g., a node) within which functions of the various embodiments can be practiced in accordance with one embodiment of the present invention. The computer system is housed on one or more PC boards, and includes one or more microprocessors 1302, power supplies 1306, storage media 1308, and from one to N interfaces 1310 to outside networks. In one embodiment, each of these devices is coupled to one or more busses 1304, so that signals and power can be exchanged between devices. In alternative embodiments, each of the devices could be coupled together through different connections.

Interfaces 1310 provide network connections between computer 1300 and one or more networks. Accordingly, interfaces 1310 enable the exchange of messages and information between computer 1300 and other nodes relating to operating one or more application instances in a master-slave configuration. These messages are processed and/or created by one or more microprocessors 1302 or other processing devices, in one embodiment. In addition microprocessor 1302 executes the main master-slave task, the monitor task, and the new configuration task, at various times, in accordance with the various embodiments of the invention.

Besides executing the various embodiments on a general-purpose computer system, computer executable instructions for performing the methods of the various embodiments can be stored on one or more computer readable media. For example, such computer executable instructions can be stored on RAM, ROM, hard drive, CD, magnetic disk, disk drive, a combination of these types of storage media, and/or other types of storage media that are well known to those of skill in the art.

CONCLUSION

Various embodiments of methods for supporting communications between multiple nodes operating in a master-slave configuration have been described. The various embodiments have numerous advantages over prior art methods and apparatus. For example, the methods of the various embodiments enable multiple application instances within a single node to be managed using a master-slave configuration, rather than managing only a single application instance, as was possible with the prior art. In addition, the various embodiments can continually listen for and begin managing new application instances within the node or in other nodes. The methods and apparatus of the various embodiments also are easily scalable from 2 to N nodes, without changing the design or implementation of the protocol.

Besides these advantages, the methods and apparatus of the present invention efficiently creates and processes Heartbeat messages, in a manner which conserves network resources. In addition, each node efficiently maintains accurate configuration information. The methods and apparatus of the present invention provide numerous other advantages over the prior art, as well.

In the foregoing detailed description of the preferred embodiments, reference is made to the accompanying drawings, which form a part hereof, and in which are shown by way of illustration specific preferred embodiments in which the invention may be practiced. These embodiments are described in sufficient detail to enable those skilled in the art to practice the invention. It will be appreciated by those of ordinary skill in the art that any arrangement, which is calculated to achieve the same purpose, may be substituted for the specific embodiments shown.

This application is intended to cover various adaptations or variations of the present invention. The foregoing detailed description is, therefore, not to be taken in a limiting sense, and it will be readily understood by those skilled in the art that various other changes in the details, materials, and arrangements of the parts and steps, which have been described and illustrated in order to explain the nature of this invention, may be made without departing from the scope of the invention as expressed in the adjoining claims. Therefore, all such changes are intended to fall within the scope of the present invention.

What is claimed is:

1. A method, performed by a node, for supporting communications between nodes that are connected by one or more networks and which operate in a master-slave configuration, the method comprising:

generating, by the node, a heartbeat message, which has a format that allows multiple heartbeat segments to be included within the heartbeat message, wherein each heartbeat segment of the multiple heartbeat segments is respectively associated with an application instance being managed by the node and includes one or more fields including a field identifying the associated application instance; and sending the heartbeat message to one or more other nodes over the one or more networks to be processed by the one or more other nodes.

2. The method as claimed in claim 1, wherein generating the heartbeat message comprises generating the heartbeat message with a heartbeat segment that identifies an application instance in a master state.

3. The method as claimed in claim 1, wherein generating the heartbeat message comprises generating the heartbeat message with a heartbeat segment that identifies an application instance in a slave state.

4. The method as claimed in claim 1, wherein generating the heartbeat message comprises including a field, in a heartbeat segment, that identifies a configuration associated with the application instance.

5. The method as claimed in claim 1, wherein generating the heartbeat message comprises generating the heartbeat message with a single heartbeat segment after a master application instance has been promoted to a master state, wherein the single heartbeat segment identifies the master application instance.

6. The method as claimed in claim 1, further comprising:
determining whether each heartbeat segment within the heartbeat message would be the same as previously sent heartbeat segments; and
if each heartbeat segment would be substantially the same, sending the previously sent heartbeat segments.

7. The method as claimed in claim 1, further comprising:
determining whether a problem has occurred with a master application instance in the master state; and
if a problem has occurred, not including a heartbeat segment for the master application instance in the heartbeat message.

8. The method as claimed in claim 1, wherein the one or more networks include multiple networks, and wherein sending the heartbeat message comprises alternating which of the one or more networks the node sends the heartbeat message out over.

9. A method, performed by a local node, for supporting communications between nodes that are connected by one or more networks and which operate in a master-slave configuration, the method comprising:
receiving, by the local node, a heartbeat message from a remote node, the heartbeat message has a format that allows multiple heartbeat segments to be included within the heartbeat message, wherein each heartbeat segment of the multiple heartbeat segments is respectively associated with an application instance being managed by the node and includes one or more fields including a field identifying the associated application instance; and
processing a heartbeat segment of the heartbeat message based on the field identifying the application instance being managed by the remote node.

10. The method as claimed in claim 9, wherein processing the heartbeat segment comprises:
sending a quit message to the remote node when the remote node considers itself to be a master for the application instance, and the local node considers itself to be the master for the application instance.

11. The method as claimed in claim 9, wherein processing the heartbeat segment comprises:
restarting a timer associated with the application instance when the local node considers itself to be a slave for the application instance.

12. The method as claimed in claim 9, wherein processing the heartbeat segment comprises:
determining, from the heartbeat segment, whether the local node has current configuration information for the application instance; and
if the local node does not have the current configuration information, indicating that new configuration information is needed.

13. The method as claimed in claim 9, wherein processing the heartbeat segment comprises:
storing a node identifier for the remote node when the local node considers itself to be a master for the application instance associated with the heartbeat segment.

14. A method, performed by a first node, for supporting communications between nodes that are connected by one or more networks and which operate in a master-slave configuration, the method comprising:
generating, by the first node, a heartbeat message, which has a format that allows multiple heartbeat segments to be included within the heartbeat message, wherein a heartbeat segment includes a field identifying a current configuration associated with an application instance being managed by the first node; and
sending the heartbeat message to one or more other nodes over the one or more networks to be processed by the one or more other nodes.

15. The method as claimed in claim 14, wherein generating the heartbeat message comprises generating the heartbeat message with an indication of the current configuration for some or all application instances.

16. A method, performed by a local node, for supporting communications between nodes that are connected by one or more networks and which operate in a master-slave configuration, the method comprising:
generating, by the local node, a heartbeat message, which has a format that allows multiple heartbeat segments to be included within the heartbeat message, wherein the multiple heartbeat segments correspond to multiple application instances being managed by the local node and wherein each heartbeat segment includes one or more fields including a field identifying a corresponding application instance and a field identifying a current configuration associated with the corresponding application instance;
sending the heartbeat message to one or more remote nodes over the one or more networks;
receiving, by the remote node, the heartbeat message; and
processing, by the remote node, each heartbeat segment of the heartbeat message.

17. The method as claimed in claim 16, wherein generating the heartbeat message comprises generating the heartbeat message with a heartbeat segment that identifies an application instance in a slave state.

18. The method as claimed in claim 16, wherein generating the heartbeat message comprises generating the heartbeat message with a heartbeat segment that identifies an application instance in a master state.

19. The method as claimed in claim 16, wherein processing each heartbeat segment comprises:
determining, from a heartbeat segment, whether the remote node has current configuration information for the application instance; and
if the remote node does not have the current configuration information, indicating that new configuration information is needed.

20. A node within a computer system which operates in a master-slave configuration, the node comprising:
at least one processor that generates a heartbeat message, which has a format that allows multiple heartbeat segments to be included within the heartbeat message, wherein each heartbeat segment of the multiple heartbeat segments is respectively associated with an application instance being managed by the node and includes one or more fields including a field identifying the associated application instance; and at least one interface to at least one external network, which sends the heartbeat message to one or more other nodes over at least one external network to be processed by the one or more other nodes.

21. The node as claimed in claim 20, wherein the at least one processor generates the heartbeat message with a single heartbeat segment after a master application instance has been promoted to a master state, wherein the single heartbeat segment identifies the master application instance.

22. The node as claimed in claim 20, wherein the at least one processor generates the heartbeat message with a field, in each heartbeat segment, that identifies a configuration associated with the application instance.

23. A local node within a computer system which operates in a master-slave configuration, the local node comprising:

at least one interface to at least one external network, wherein the at least one external network interconnects the local node and one or more remote nodes, and the at least one interface receives a heartbeat message from a remote node, which has a format that allows multiple heartbeat segments to be included within the heartbeat message, wherein each heartbeat segment of the multiple heartbeat segments is respectively associated with an application instance being managed by the node and includes one or more fields including a field identifying the associated application instance; and at least one processor, which processes a heartbeat segment of the heartbeat message.

24. The local node as claimed in claim 23, wherein the at least one processor processes the heartbeat segment by sending a quit message to the remote node when the remote node considers itself to be a master for the application instance, and the local node considers itself to be the master for the application instance.

25. The local node as claimed in claim 23, wherein the at least one processor processes the heartbeat segment by restarting a timer associated with the application instance when the local node considers itself to be a slave for the application instance.

26. The local node as claimed in claim 23, wherein the at least one processor processes the heartbeat segment by:

determining, from the heartbeat segment, whether the local node has current configuration information for the application instance; and if the local node does not have the current configuration information, indicating that new configuration information is needed.

27. A computer readable medium having computer executable instructions stored thereon for performing a method of supporting communications between a local node and one or more other nodes operating in a master-slave configuration, the method comprising:

generating, by the local node, a first heartbeat message, which has a format that allows multiple heartbeat segments to be included within the heartbeat message, wherein each heartbeat segment includes a field identifying an application instance being managed by the local node;

sending the first heartbeat message to one or more remote nodes over the one or more networks;

receiving, by the local node, a second heartbeat message from a remote node; and processing a heartbeat segment of the second heartbeat message, wherein the heartbeat segment includes a field identifying an application instance being managed by the remote node.

28. The method as claimed in claim 27, wherein generating the first heartbeat message comprises generating the first heartbeat message with a heartbeat segment that identifies an application instance in a slave state.

29. The method as claimed in claim 27, wherein generating the first heartbeat message comprises generating the first heartbeat message with a heartbeat segment that identifies an application instance in a master state.

30. The method as claimed in claim 27, wherein processing the heartbeat segment comprises:

determining, from the heartbeat segment, whether the local node has current configuration information for the application instance being managed by the remote node; and if the local node does not have the current configuration information, indicating that new configuration information is needed.

31. A node within a computer system which operates in a master-slave configuration, the node comprising:

means for processing, which generates a local heartbeat message that has a format that allows multiple heartbeat segments to be included within the local heartbeat message, wherein a heartbeat segment includes one or more fields to identify and to identify a current configuration associated with the application instance, and the means for processing also processes a remote heartbeat message from a remote node; and means for interfacing with at least one external network, wherein the at least one external network interconnects the node and one or more other nodes, and wherein the means for interfacing sends the local heartbeat message to the one or more other nodes over the one or more networks, and receives the remote heartbeat message from the remote node.

32. The node as claimed in claim 31, wherein the means for processing generates the local heartbeat message by generating the local heartbeat message with a heartbeat segment that identifies an application instance in a slave state.

33. The node as claimed in claim 31, wherein the means for processing generates the local heartbeat message by generating the local heartbeat message with a heartbeat segment that identifies an application instance in a master state.

34. The node as claimed in claim 31, wherein the means for processing processes the remote heartbeat message by:

determining, from a remote heartbeat segment, whether the local node has current configuration information for an application instance identified by the remote heartbeat segment; and if the local node does not have the current configuration information, indicating that new configuration information is needed.

* * * * *

UNITED STATES PATENT AND TRADEMARK OFFICE
CERTIFICATE OF CORRECTION

PATENT NO. : 7,421,478 B1
APPLICATION NO. : 10/094552
DATED : September 2, 2008
INVENTOR(S) : Muchow It is certified that error appears in the above-identified patent and that said Letters Patent is hereby corrected as shown below:

Title Page 2, under "U.S. Patent Documents", in column 2, line 21, delete "Kample et al." and insert -- Kampe et al. --, therefor.

Title Page 2, under "Other Publications", in column 2, lines 1-3, below "OTHER PUBLICATIONS" delete "Gusella, R., et al., "An Election Algorithm for a Distributed Clock Synchronization Program", CS Technical Report #275, University of California, Berkeley, (Dec. 1985), pp. 1-14.".

Title Page 2, under "Other Publications", in column 2, lines 4-6, below "California Berkeley, Dec. 1985, pp. 1-14." delete "Gusella, R., et al., "An Election Algorithm for a Distributed Clock Synchronization Program", CS Technical Report #275, University of California, Berkeley, (Dec. 1985), pp. 1-14.".

Title Page 3, under "Other Publications", in column 1, lines 5-7, below "rfc/rfc3205.txt, HTTP Layering, RFC 3205, (2002), pp. 1-14." delete "Gusella, R., et al., "An Election Algorithm for a Distributed Clock Synchonization Program", CS Technical Report #275, University of California, Berkeley, (Dec. 1985), pp. 1-14.".

Title Page 3, under "Other Publications", in column 1, lines 11-13, below "Distribution, vol. 2C, 10 pages, (1986)." delete "Lewis, P., "A High-Availability Cluster for Linux", www2.linuxjournal.com.ljissues/issue64/3247.html, 11 Pages, (Apr. 1994).".

Title Page 3, under "Other Publications", in column 1, line 16, delete "www.vmare.com" and insert -- www.vmware.com --, therefor.

Title Page 3, under "Other Publications", in column 1, line 54, delete "10/131,274,11 pgs." and insert -- 10/131,275, 16 pgs. --, therefor.

Title Page 3, under "Other Publications", in column 1, line 61, delete "2007" and insert -- 2006 --, therefor.

Title Page 3, under "Other Publications", in column 2, line 22, delete "10/131,272" and insert -- 10/131,275 --, therefor.

CERTIFICATE OF CORRECTION (continued)
U.S. Pat. No. 7,421,478 B1

Title Page 3, under "Other Publications", in column 2, line 29, delete "Internte" and insert -- Internet --, therefor.

Title Page 3, under "Other Publications", in column 2, line 30, delete "(1993)" and insert -- (1999) --, therefor.

Signed and Sealed this

Second Day of February, 2010

David J. Kappos
*Director of the United States Patent and Trademark Office*